United States Patent
Smith et al.

(10) Patent No.: US 12,509,552 B2
(45) Date of Patent: Dec. 30, 2025

(54) LIPIDATED POLY(AMINO ACID) NANOSTRUCTURES

(71) Applicant: THE CURATORS OF THE UNIVERSITY OF MISSOURI, Columbia, MO (US)

(72) Inventors: Josiah Smith, Hartford, CT (US); Bret Ulery, Columbia, MO (US)

(73) Assignee: The Curators of the University of Missouri, Columbia, MO (US)

( * ) Notice: Subject to any disclaimer, the term of this patent is extended or adjusted under 35 U.S.C. 154(b) by 82 days.

(21) Appl. No.: 17/716,498

(22) Filed: Apr. 8, 2022

(65) Prior Publication Data
US 2022/0356303 A1  Nov. 10, 2022

Related U.S. Application Data

(60) Provisional application No. 63/172,323, filed on Apr. 8, 2021.

(51) Int. Cl.
| | |
|---|---|
| *C08G 69/04* | (2006.01) |
| *A61K 9/107* | (2006.01) |
| *A61K 9/51* | (2006.01) |
| *A61K 31/704* | (2006.01) |
| *C08G 69/10* | (2006.01) |

(52) U.S. Cl.
CPC ............ *C08G 69/04* (2013.01); *A61K 9/1075* (2013.01); *A61K 9/5123* (2013.01); *A61K 9/5192* (2013.01); *A61K 31/704* (2013.01); *C08G 69/10* (2013.01)

(58) Field of Classification Search
CPC .. A61K 31/704; A61K 9/1075; A61K 9/5192; C08G 69/10; C08G 69/04
See application file for complete search history.

(56) References Cited

U.S. PATENT DOCUMENTS

2018/0194967 A1* 7/2018 Ulery ..................... A01N 37/46

FOREIGN PATENT DOCUMENTS

| JP | 2014524477 A | * | 9/2014 | ............... C07K 7/06 |
| KR | 100909786 B1 | * | 7/2009 | ........... C07C 237/12 |
| WO | WO-2010126319 A2 | * | 11/2010 | ......... A61K 49/0082 |

OTHER PUBLICATIONS

Andolfi, A. et al., Perspectives in Medicinal Chemistry. 2008:2 81-112. (Year: 2008).*
Cui, H. et al., Biopolymers. 2010; 94(1): 1-18. (Year: 2010).*
Chen, J. et al., Biomaterials. 32, (2011) 1678-1684. (Year: 2011).*
Ning, Y. et al., Food Bioscience. 42, (2021) 101091 (Year: 2021).*
Dittrich, C. JP-2014524477-A. English Translation. (Year: 2014).*
Smith, J., et al. Phys. Biol. 15, (2018), 065006. (Year: 2018).*
Oh, Y., et al. KR-100909786-B1. 2009. English Translation (Year: 2009).*
Chang, R. S., et al. WO-2010126319-A2. 2010. English Translation (Year: 2010).*
Smith, J. D., et al. BioRxiv. 2020. p. 1-14. (Year: 2020).*
A. C. Society, Cancer Facts & Figures 2018. (2018) (76 pgs).
P. Feugier, et al., "Long-term results of the R-CHOP study in the treatment of elderly patients with diffuse large B-cell lymphoma: a study by the Groupe d'Etude des Lymphomes de l'Adulte". J Clin Oncol 23, 4117-4126 (2005) (10 pgs).
B. Kaplan, et al., "Rituximab and immune deficiency: case series and review of the literature". J Allergy Clin Immunol Pract 2, 594-600 (2014) (8 pgs).
S. Oerlemans et al., "A high level of fatigue among long-term survivors of non-Hodgkin's lymphoma: results from the longitudinal population-based Profiles registry in the south of the Netherlands". Haematologica 98, 479-486 (2013) (8 pgs).
D. Jagadeesh, et al., "Antibody Drug Conjugates (ADCs): Changing the Treatment Landscape of Lymphoma". Curr Treat Options Oncol 17, 55 (2016). (Abstract only).
M. Takahashi, "Aptamers targeting cell surface proteins". Biochimie 145, 63-72 (2018). (Abstract only).
F. Pastor, "Aptamers: A New Technological Platform in Cancer Immunotherapy". Pharmaceuticals (Basel) 9, (2016) (13 pgs).
F. Opazo et al., "Modular Assembly of Cell-targeting Devices Based on an Uncommon G-quadruplex Aptamer". Mol Ther Nucleic Acids 4, e251 (2015) (11 pgs).
K. E. Maier et al., "A New Transferrin Receptor Aptamer Inhibits New World Hemorrhagic Fever Mammarenavirus Entry". Mol Ther Nucleic Acids 5, e321 (2016) (16 pgs).
D. Porciani, et al., "Modular cell-internalizing aptamer nanostructure enables targeted delivery of large functional RNAs in cancer cell lines". Nat Commun 9, 2283 (2018) (13 pgs).
M. Xing, et al., "Efficacy and Cardiotoxicity of Liposomal Doxorubicin-Based Chemotherapy in Advanced Breast Cancer: A Meta-Analysis of Ten Randomized Controlled Trials". PLoS One 10, e0133569 (2015) (9 pgs).
T. Betancourt, et al., "Doxorubicin-loaded PLGA nanoparticles by nanoprecipitation: preparation, characterization and in vitro evaluation". Nanomedicine (Lond) 2, 219-232 (2007). (Abstract only).
M. Cagel, et al., "Doxorubicin: nanotechnological overviews from bench to bedside". Drug Discov Today 22, 270-281 (2017). (Abstract only).
A. Ahsan, et al., "Efficacy of an EGFR-specific peptide against EGFR-dependent cancer cell lines and tumor kenografts". Neoplasia 16, 105-114 (2014) (12 pgs).
K. Zabielska-Koczywas, et al., "The Use of Liposomes and Nanoparticles as Drug Delivery Systems to Improve Cancer Treatment in Dogs and Cats". Molecules 22, (2017) (14 pgs).

(Continued)

*Primary Examiner* — Eric Olson
*Assistant Examiner* — Samuel L Galster
(74) *Attorney, Agent, or Firm* — Stinson LLP

(57) ABSTRACT

The present disclosure is directed to novel lipidated poly (amino acid)s (LPAAs). The present disclosure is further related to processes for preparing such novel lipidated poly(amino acid)s (LPAAs) and for preparing novel lipidated poly(amino acid)s nanoparticles (LPAANPs). Additionally, the present disclosure relates to processes for utilizing lipidated poly(amino acid)s (LPAAs) that are biocompatible and capable of drug delivery.

14 Claims, 12 Drawing Sheets
Specification includes a Sequence Listing.

(56) References Cited

OTHER PUBLICATIONS

C. Secker, et al., "Poly(alpha-Peptoid)s Revisited: Synthesis, Properties, and Use as Biomaterial". Macromol Biosci 15, 881-891 (2015). (Abstract only).
T. J. Deming, "Synthesis of Side-Chain Modified Polypeptides". Chem Rev 116, 786-808 (2016) (23 pgs).
S. H. Wibowo, et al., "Polypeptide films via N-carboxyanhydride ring-opening polymerization (NCA-ROP): past, present and future". Chem Commun (Camb) 50, 4971-4988 (2014) (18 pgs).
J. Zou et al., "A facile glovebox-free strategy to significantly accelerate the syntheses of well-defined polypeptides by N-carboxyanhydride (NCA) ring opening polymerizations". Macromolecules 46, 4223-4226 (2013) (10 pgs).
D. J. Price et al., "Poly(amino acid)-polyester graft copolymer nanoparticles for the acid-mediated release of doxorubicin". Chem Commun (Camb) 53, 8687-8690 (2017) (4 pgs).
S. Mommer, et al., "One-Pot Synthesis of Amino Acid-Based Polyelectrolytes and Nanoparticle Synthesis". Biomacromolecules 18, 159-168 (2017). (Abstract only).
D. Mandal, et al., "Self-assembly of peptides to nanostructures". Org Biomol Chem 12, 3544-3561 (2014) (58 pgs).
H. Acar, et al., "Molecular engineering solutions for therapeutic peptide delivery". Chem Soc Rev 46, 6553-6569 (2017). (Abstract only).
H. Xu, et al., "Amphiphilic poly(amino acid) based micelles applied to drug delivery: the in vitro and in vivo challenges and the corresponding potential strategies". J Control Release 199, 84-97 (2015) (14 pgs).
A. Lalatsa, et al., "Amphiphilic poly(L-amino acids)—new materials for drug delivery". J Control Release 161, 523-536 (2012). (Abstract only).
J. R. Kramer, et al., "General method for purification of alpha-amino acid-n-carboxyanhydrides using flash chromatography". Biomacromolecules 11, 3668-3672 (2010). (Abstract only).
D. Huesmann et al., "Revisiting Secondary Structures in NCA Polymerization: Influences on the Analysis of Protected Polylysines". Macromolecules 47, 928-936 (2014). (Abstract only).
A. Trent et al., "Peptide amphiphile micelles self-adjuvant group A streptococcal vaccination". AAPS J 17, 380-388 (2015) (9 pgs).
R. Zhang, et al., "Instructive Design of Triblock Peptide Amphiphiles for Structurally Complex Micelle Fabrication". Acs Biomaterials Science & Engineering 4, 2330-2339 (2018). (Abstract only).
J. D. Smith, et al., "Aptamer-displaying peptide amphiphile micelles as a cell-targeted delivery vehicle of peptide cargoes". Phys Biol 15, 065006 (2018). (Abstract only).
A. J. Domb, "Biodegradable polymers derived from amino acids". Biomaterials 11, 686-689 (1990). (Abstract only) (12 pgs) (Abstract only).
G. J. Habraken, et al., "Thiol chemistry on well-defined synthetic polypeptides". Chem Commun (Camb), 3612-3614 (2009). (Abstract only).
S. J. Lam, et al., "Combating multidrug-resistant Gram-negative bacteria with structurally nanoengineered antimicrobial peptide polymers". Nat Microbiol 1, 16162 (2016) (11 pgs).
A. Dehsorkhi, et al., "Self-assembling amphiphilic peptides". J Pept Sci 20, 453-467 (2014) (15 pgs).

Z. Song, et al., "Self-assembly of peptide amphiphiles for drug delivery: the role of peptide primary and secondary structures". Biomater Sci 5, 2369-2380 (2017). (Abstract only).
A. Manandhar, et al., "Molecular simulations of peptide amphiphiles". Org Biomol Chem 15, 7993-8005 (2017) (25 pgs).
T. Akagi, et al., "Stabilization of polyion complex nanoparticles composed of poly(amino acid) using hydrophobic interactions". Langmuir 26, 2406-2413 (2010). (Abstract only).
T. Akagi, et al., "Formation of unimer nanoparticles by controlling the self-association of hydrophobically modified poly (amino acid)s". Langmuir 28, 5249-5256 (2012). (Abstract only).
T. Akagi, et al., "Preparation and characterization of biodegradable nanoparticles based on poly(gamma-glutamic acid) with I-phenylalanine as a protein carrier". J Control Release 108, 226-236 (2005) (32 pgs).
K. Wang, et al., "A novel delivery system of doxorubicin with high load and pH-responsive release from the nanoparticles of poly (alpha, beta-aspartic acid) derivative". Eur J Pharm Sci 47, 256-264 (2012). (Abstract only).
I. Cohen-Erez, et al., "Negatively charged polypeptide-peptide nanoparticles showing efficient drug delivery to the mitochondria". Colloids Surf B Biointerfaces 162, 186-192 (2018). (Abstract only).
Z. Folchman-Wagner, et al., "Characterization of Polyelectrolyte Complex Formation Between Anionic and Cationic Poly(amino acids) and Their Potential Applications in pH-Dependent Drug Delivery". Molecules 22, (2017) (14 pgs).
S. Chopra, et al., "Design of Insulin-Loaded Nanoparticles Enabled by Multistep Control of Nanoprecipitation and Zinc Chelation". ACS Appl Mater Interfaces 9, 11440-11450 (2017). (11 pgs).
M. Mir, et al., "Recent applications of PLGA based nanostructures in drug delivery". Colloids Surf B Biointerfaces 159, 217-231 (2017). (Abstract only).
C. D. Spicer, et al., "Peptide and protein nanoparticle conjugates: versatile platforms for biomedical applications". Chem Soc Rev 47, 3574-3620 (2018) (93 pgs).
E. Frohlich, "The role of surface charge in cellular uptake and cytotoxicity of medical nanoparticles". Int J Nanomedicine 7, 5577-5591 (2012) (16 pgs).
S. A. A. Rizvi, et al., "Applications of nanoparticle systems in drug delivery technology". Saudi Pharm J 26, 64-70 (2018) (7 pgs).
H.M. Kantarjian, et al., "Inotuzumab ozogamicin versus standard of carer in relapsed or refractory acute lymphoblastic eukemia: Final report and long-term survival follow-up from the randomized, phase 3 INO-VATE study". Cancer, (2019) (14 pgs).
Y.N. Lamb, "Inotuzumab Ozogamicin: First Global Approval". Drugs, Sep. 2017; 77(14): 1603-1610. (2017) (Abstract only).
N. Dan et al., "Antibody-Drug Conjugates for Cancer Therapy: Chemistry to Clinical Implications". Pharmaceuticals 2018 11, 32; (2018) (22 pgs).
C. Wu, et al., "Induction of potent apoptosis by an anti-CD20 aptamer via the crosslink of membrane CD20 on non-Hodgkins' lymphoma cells". RSC Advances, 2017, 7, 5158-5166 (2017) (9 pgs).
D. Porciani, et al., "Two Interconvertible Folds Modulate the Activity of a DNA Aptamer Against Transferrin Receptor". Mol Ther Nucleic Acids, 2014, 3, e144 (2014) (13 pgs).
S. Tonapi, et al., "Translocation of a Cell Surface Spliceosomal Complex Induces Alternative Splicing Events and Lymphoma Cell Necrosis". Cell Chem Biol, 2019, (2019) (32 pgs).

\* cited by examiner

LIPIDATED POLY(AMINO ACID) NANOSTRUCTURES

CROSS REFERENCE TO RELATED APPLICATIONS

This application claims priority to and the benefit of Provisional Application Ser. No. 63/172,323, filed Apr. 8, 2021, the entire contents of which are incorporated herein by reference.

GOVERNMENT SUPPORT

This invention was made with government support under grant number R21 AI1121938 awarded by the National Institutes of Health (NIH). The government has certain rights in the invention.

INCORPORATION OF SEQUENCE LISTING

A paper copy of the Sequence Listing and a computer readable form of the Sequence Listing containing the file named "0800528.021201_Sequence_Listing_ST25," which is 1,908 bytes in size (as measured in MICROSOFT WINDOWS® EXPLORER) and was created on Apr. 28, 2022, are provided herein and are herein incorporated by reference. This Sequence Listing consists of SEQ ID NOs: 1-5.

FIELD OF THE INVENTION

The present invention relates to lipidated poly(amino acid) (hereinafter "LPAA") nanostructures. In particular, LPAA nanostructures and their use as delivery vehicles for therapeutics.

BACKGROUND TO THE INVENTION

Poly(amino acid)s are a diverse and capable class of polymers with significant potential for utilization in a wide variety of drug delivery applications. A sub-class of these biomaterials known as lipidated poly(amino acid)s (hereinafter "LPAAs") are amphiphiles composed of both hydrophobic and hydrophilic domains yielding interesting physical properties.

A need exists for preparing novel LPAAs, processes for preparing such LPAAs, and processes for utilizing LPAAs that are biocompatible and capable of drug delivery.

SUMMARY OF THE INVENTION

The present invention is directed to a lipidated poly (amino acid). The lipidated poly(amino acid) comprises lysine, valine, or combinations thereof.

In one aspect, the present invention is directed to a process for preparing a lipidated poly(amino acid). The process comprises combining an amino acid and a reagent to form a N-carboxyanhydride amino acid and conducting a ring opening polymerization reaction of the N-carboxyanhydride amino acid to form the lipidated poly(amino acid). The ring opening polymerization reaction comprises contacting the N-carboxyanhydride amino acid with one or more solvents.

In another aspect, the present invention is directed to a process for preparing a process for preparing a lipidated poly(amino acid) nanoparticle. The process comprises dissolving a lipidated poly(amino acid) in a solvent to form a lipidated poly(amino acid) mixture; preparing a solution comprising an alcohol and an alkane; adding the mixture to the solution; and recovering the resulting lipidated poly (amino acid) nanoparticle precipitate.

Other objects and features will be in part apparent and in part pointed out hereinafter.

DETAILED DESCRIPTION OF THE INVENTION

Figure 1:
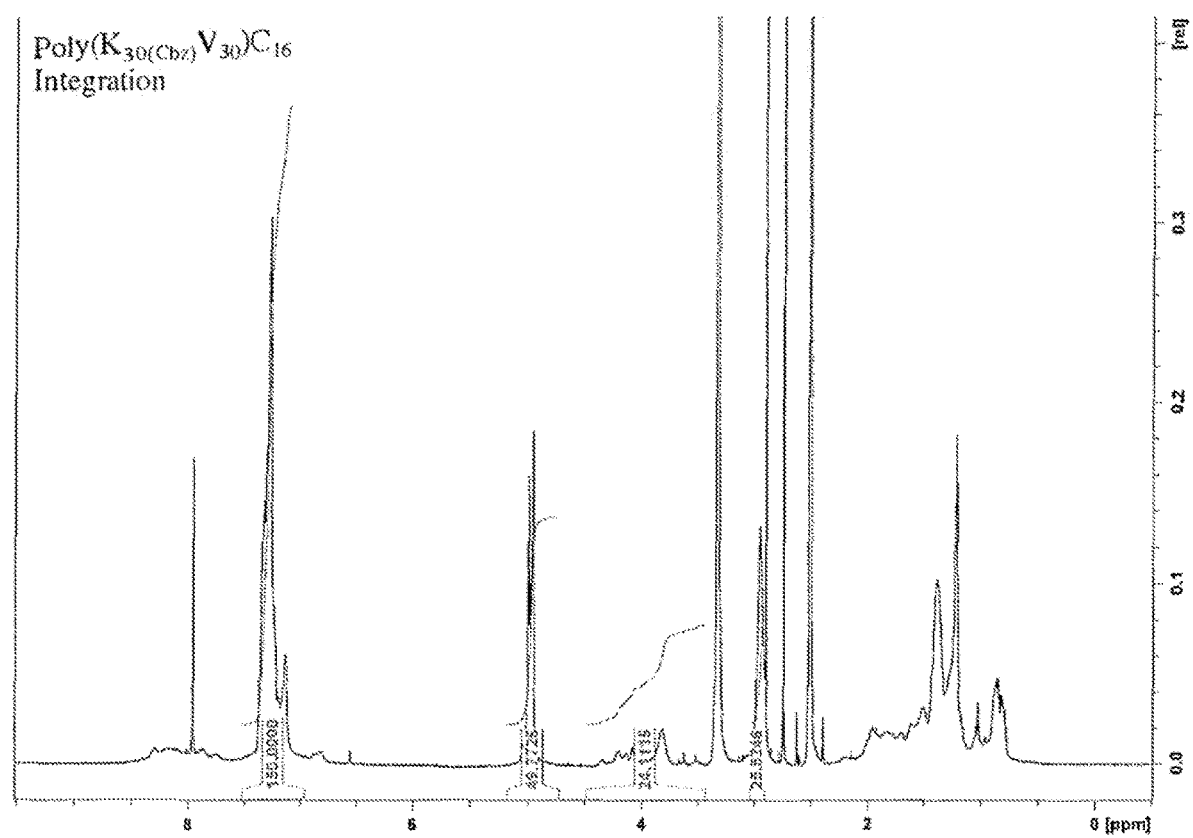
FIG. 1 is a representative $^1$H NMR spectrum of the strategy used to determine lysine/valine ratios.

Poly(amino acids) are a class of polymers unique in their facile synthesis, and diverse amino acid composition. These polymers also allow for straightforward incorporation of functional groups, while remaining highly biocompatible and capable of drug delivery.

In certain embodiments, the present invention is directed to poly(amino acids) that contain lysine, valine, or a combination thereof in various ratios. For example, H$_2$N-lysine (carboxybenzyl)-OH (lysine(Cbz)) (lysine) and/or H$_2$N-valine-OH (valine). In certain embodiments, the present invention is directed to LPAAs comprising lysine, valine, or combinations thereof.

In certain embodiments, the present invention is directed to a process for preparing a LPAA. The process comprises combining an amino acid and a reagent to form a N-carboxyanhydride (hereinafter "NCA") amino acid and conducting ring opening polymerization of the NCA amino acid to form the LPAA. The ring opening polymerization reaction may comprise contacting the NCA amino acid with one or more solvents.

In certain embodiments, the LPAA may comprise a protection group. The present invention is further directed to a process for removing this protection group (i.e., deprotection) comprising contacting the LPAA comprising a protection group with an acid and neutralizing the LPAA solution to a pH from about 6 to about 8 to form a deprotected LPAA.

In still further embodiments, the present invention is directed to a process for preparing a LPAA nanoparticle. The process comprises dissolving a LPAA in a solvent to form a LPAA mixture, preparing a solution comprising an alcohol and an alkane, adding the mixture to the solution, and recovering the resulting LPAA nanoparticle precipitate.

One aspect of the present invention is directed to preparing a LPAA. For example, a LPAA comprising lysine, valine, or combinations thereof.

In certain embodiments, the process for preparing a LPAA comprises combining an amino acid and a reagent to form a NCA amino acid and conducting ring opening polymerization of the NCA amino acid to form the LPAA. The ring opening polymerization reaction comprises contacting the NCA amino acid with one or more solvents.

The reagent may be selected from the group consisting of acetone, acetonitrile, dichloromethane, chloroform, dimethylformamide, dimethylsulfoxide, tetrahydrofuran, dioxane, ethyl acetate, diphosgene, triphosgene, carbonyl diimidazole, disuccinimidyl carbonate, and combinations thereof.

An exemplary scheme for the reaction used to form a NCA amino acid is set forth below for (a) lysine(Cbz) and (b) valine.

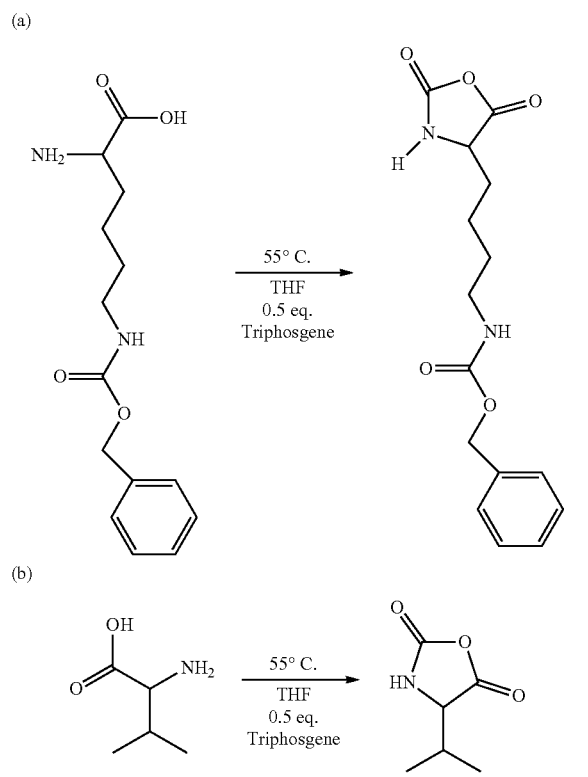

The NCA amino acid is then subjected to a ring opening polymerization reaction. The NCA amino acid or a combination thereof may be selected in order to achieve a desired final ratio for the resulting LPAA. For example, to achieve a poly(amino acid) that contains lysine and valine in various ratios, such as a lysine:valine ratio of about 2:1 or less, about 1:1 or less, about 1:2 or less, about 1:3 or less, about 1:4 or less, about 1:5 or less, about 1:6 or less, about 1:7 or less, about 1:8 or less, about 1:9 or less, about 1:10 or less, about 1:12 or less, about 1:20 or less, or about 1:25 or less.

The ring opening procedure may comprise, for example, contacting the NCA amino acid with one or more solvents.

In certain embodiments, the ring opening procedure may comprise, for example, contacting the NCA amino acid with an initiator and one or more solvents.

The one or more solvents used in this reaction may be any suitable solvent. For example, the solvent may be an organic solvent. In one embodiment, the one or more solvent is selected from the group consisting of acetone, acetonitrile, dichloromethane, chloroform, dimethylformamide, dimethylsulfoxide, tetrahydrofuran, dioxane, ethyl acetate, and combinations thereof. In certain embodiments, the one or more solvents comprises a mixture of dimethylformamide and chloroform. In certain embodiments, the mixture of dimethylformamide and chloroform comprises a weight ratio of dimethylformamide:chloroform of about 1:1.

The reaction may comprise an initiator. Suitable initiators include, but are not necessarily limited to amines, including but not necessarily limited to primary amines. The initiator may be selected from the group consisting of butylamine, octylamine, decylamine, dodecylamine, tetradecylamine, hexadecylamine, octadecylamine, icosylamine, doicosylamine, tetraicosylamine, hexaicosylamine, octaicosylamine, triacontaylamine, dotriacontylamine, or combinations thereof.

An exemplary reaction scheme for the ring opening polymerization is shown below. A primary amine acts as an initiator (I), through which a NCA monomer ring is destabilized and attached. This is followed by decarboxylation, which yields a chain end primary amine group. The reaction propagates one NCA at a time until all of the monomers are incorporated into the polymer strands. The reaction can be controllably carried out using a solvent mixture (e.g., dimethylformamide (DMF) and chloroform ($CHCl_3$)) and warming the mixture from 0° C. to room temperature (rt) overnight. In the below reaction scheme, hexadecylamine was used as an initiator.

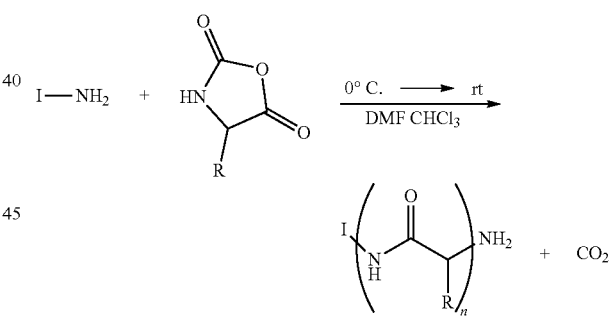

The resulting product of the ring opening polymerization reaction of the NCA amino acid is a LPAA.

In certain embodiments, the LPAA may comprise a protection group. For example, a lysine-containing LPAA comprising a carboxybenzyl (Cbz) protection group. In some embodiments it may be desirable to remove the LPAA protection group (i.e. by a deprotection process). The deprotection process may comprise, for example, contacting the LPAA comprising a protection group (e.g., lysine carboxybenzyl, lysine methyltrityl, lysine butyloxycarboyl) with an acid to form a LPAA solution; and neutralizing the LPAA solution to a pH of from about 6 to about 8 to form a deprotected LPAA.

In certain embodiments, the acid may be selected from the group consisting of hydrobromic acid, hydrochloride acid, trifluoroacetic acid, acetic acid, citric acid, and combinations thereof.

An exemplary reaction scheme for the deprotection process is shown below.

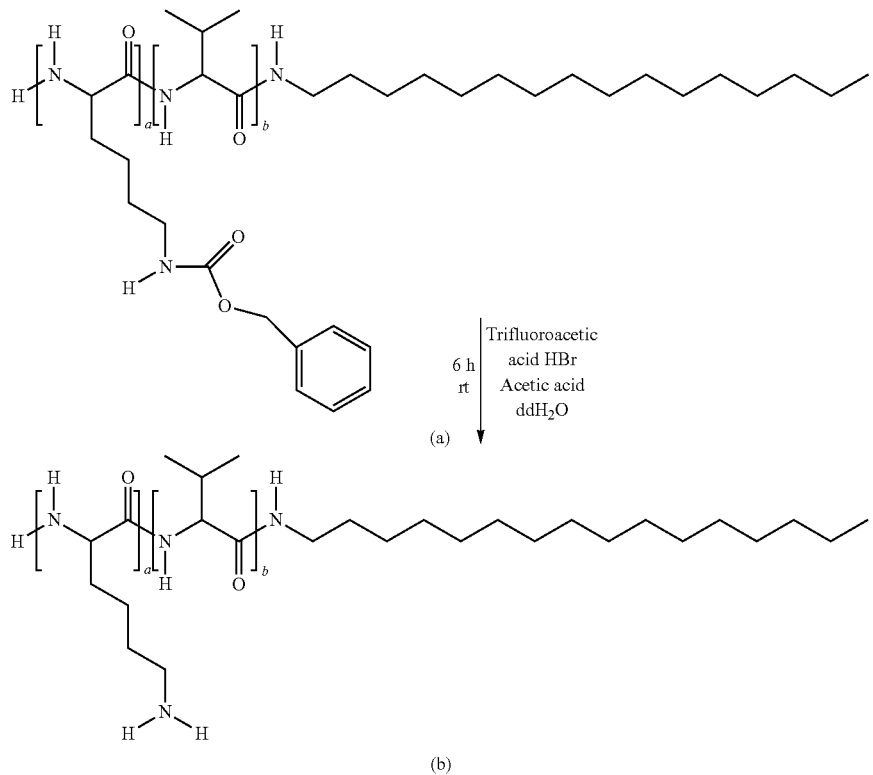

In certain embodiments, the LPAAs may self-assemble into micelles (i.e., forming LPAAMs). This may be assessed through evaluating the critical micelle concentration (CMC). The CMC corresponds to the minimum concentration at which the LPAAs may self-assemble to form micelles.

The LPAAMs of the present invention may have a CMC from about 0.5 to about 7.5 µg/mL. For example, from about 1.0 to about 7.5, from about 1.5 to about 7.5, from about 2.0 to about 7.5, from about 2.5 to about 7.5, from about 2.5 to about 7.0, from about 2.5 to about 6.5, from about 2.5 to about 6.0, from about 2.5 to about 5.5, from about 2.5 to about 5.0, from about 3.0 to about 5.5, from about 3.5 to about 5.5, from about 3.5 to about 5.0, or from about 4.0 to about 5.0 µg/mL.

LPAAMs of the present invention may have a micelle diameter of about 5.0 nm or greater, about 5.5 nm or greater, about 6.0 nm or greater, about 6.5 nm or greater, about 7.0 nm or greater, about 7.5 nm or greater, about 8.0 nm or greater, about 8.5 nm or greater, about 9.0 nm or greater, about 9.5 nm or greater, or about 10.0 nm or greater. In other embodiments, the LPAAMs of the present invention may have a micelle diameter of about 70 nm or greater, about 75 nm or greater, about 80 nm or greater, about 85 nm or greater, about 90 nm or greater, about 95 nm or greater, or about 100 nm or greater.

It was discovered that the nanostructure size increased from the more hydrophilic (Poly($K_{30}V_{30}$)$C_{16}$ and Poly($K_{15}V_{45}$)$C_{16}$) LPAAs to the more hydrophobic (Poly($K_6V_{54}$)$C_{16}$ and Poly($K_3V_{57}$)$C_{16}$) LPAAs. Without being bound by the theory, it is believed that this size difference was caused by the fewer lysine groups in Poly($K_6V_{54}$)$C_{16}$ and Poly($K_3V_{57}$)$C_{16}$ LPAAMs. This was thought to require a larger number of polymer chains to aggregate in order to provide a sufficient number of amine groups to stabilize the water-exposed exterior surface of each LPAAM.

In other embodiments of the present invention, a process may be conducted to prepare LPAA nanoparticles (i.e. LPAANPs). The process may comprise, for example, dissolving a LPAA in a solvent to form a LPAA mixture; preparing a solution comprising an alcohol and an alkane; adding the mixture to the solution; and recovering the resulting LPAANP precipitate.

The solvent may be selected from the group consisting of acetone, acetonitrile, dichloromethane, chloroform, dimethylformamide, dimethylsulfoxide, tetrahydrofuran, dioxane, ethyl acetate, and combinations thereof.

The alcohol may be selected from the group consisting of $C_1$-$C_{30}$ alcohols. For example, a $C_1$-$C_{25}$ alcohol, $C_1$-$C_{20}$ alcohol, $C_5$-$C_{20}$ alcohol, $C_5$-$C_{15}$ alcohol, $C_5$-$C_{10}$ alcohol, or $C_5$-$C_8$ alcohol. In some embodiments, the alcohol may comprise 1-octanol. In other embodiments, the alcohol may comprise a medium size alcohol (e.g., $C_5$-$C_8$).

The alkane may be selected from the group consisting of $C_1$-$C_{30}$ alkanes. For example, a $C_1$-$C_{25}$ alkane, $C_1$-$C_{20}$ alkane, $C_1$-$C_{15}$ alkane, $C_1$-$C_{10}$ alkane, or $C_5$-$C_{10}$ alkane. In some embodiments, the alkane may comprise pentane. In other embodiments, the alkane may comprise a medium size alkane (e.g., $C_5$-$C_{10}$).

In certain embodiments, the alcohol is a $C_1$-$C_{30}$ alcohol and the alkane is a $C_1$-$C_{30}$ alkane. For example, in some embodiments, the alcohol comprises 1-octanol and the alkane comprises pentane.

In some embodiments, the process for preparing LPAANP comprises adding the LPAA mixture to a solution comprising an alcohol and an alkane in a dropwise manner.

It was discovered, that a process comprising the use of a solvent (e.g., dimethylformamide) and alcohol/alkane solution (1-octanol/pentane) allowed for numerous advantages such as high precipitation efficiency (>97%), biocompatibility of each solvent, ease of solvent removal, and fast production of nanoparticles.

In another aspect of the present invention, the LPAAM or LPAANP may further comprise an entrapped component. For example, a therapeutic component, a cancer destroying component, adjuvants, anti-inflammatory therapeutics, immunomodulatory drugs, vaccines, growth factors, and combinations thereof. In some embodiments, the LPAAM or LPAANP further comprises an entrapped component selected from the group consisting of a small molecule therapeutic, a peptide, a peptide amphiphile, a protein, and combinations thereof. In certain embodiments, the peptide amphiphile may comprise a fluorophore-labeled peptide amphiphile (Palm$_2$KK(FAM)-RPDRKLEVFEKE-FLRMELGER) (SEQ ID NO: 1), where FAM is 5(6)-carboyxyfluoroscein (FAM). In other embodiments, the hydrophilic peptide may comprise a fluorophore-labeled peptide (FAM-GRKKRRQRRRPPRPDRKLEVFEKE-FLRMELGERC) (SEQ ID NO: 2).

In some embodiments, a LPAANP further comprises an entrapped component and is prepared by mixing the entrapped component with the LPAA solution, and recovering the nanoparticle precipitate as described above.

In some embodiments, the entrapped component is present in an weight ratio of entrapped species: LPAA of about 1:1 or less, about 1:2 or less, about 1:3 or less, about 1:4 or less, about 1:5 or less, about 1:6 or less, about 1:7 or less, about 1:8 or less, about 1:9 or less, about 1:10 or less, about 1:15 or less, about 1:20 or less, or about 1:25 or less.

In a further aspect of the present invention, LPAAMs or LPAANPs of the present invention may be modified to display cell-targeting components. For example, small molecules, peptides, aptamers and/or proteins (e.g., antibodies).

In some embodiments, LPAAMs can be surface functionalized by the incorporation of a DNA anti-tail amphiphile, which allows for hybridization of NHL-specific aptamer (e.g., C10.36-tail), point mutant specificity control (e.g., for C10.36-G24A-tail), and/or a non-targeting DNA aptamer (scApt-tail or scDW4).

In some embodiments, the surface may be modified with a DNA antitail, NHL-specific aptamer (e.g., C10.36-tail), point mutant specificity control (e.g., for C10.36-G24A-tail), and/or a non-targeting DNA aptamer (scApt-tail or scDW4). In further embodiments, the LPAANP may be surface modified with maleimide. The sequences of C10.36, G24A, and scApt are set forth below.

```
C10.36
                                             (SEQ ID NO: 3)
CTAACCCCGGGTGTGGTGGGTGGGCAGGGGGGTTAGCGACGACGACGACG

ACGACGA

G24A
                                             (SEQ ID NO: 4)
CTAACCCCGGGTGTGGTGGGTGGACAGGGGGGTTAGCGACGACGACGACG

ACGACGA scApt
                                             (SEQ ID NO: 5)
GCCATTGCCATTGCCATTGCCATTGCCATTGCCATTGCCATTGCCATTGC

CATTGCGACGACGACGACGACGACGA
```

In some embodiments, the LPAAM or LPAANP is surface modified by combining a surface modifying component and a LPAANP, allowing the components to react, and recovering the surface modified precipitant. For example, maleimide-deiethyleneglycol-tetrafluorophenol ester (Mal-DEG-TFP) may be added to a solution of LPAAMs or LPAANPs containing entrapped doxorubicin. Assuming that the LPAAM or LPAANP containing entrapped doxorubicin has an average molecular weight of 7,000 daltons, the components may be combined in a ratio of Mal-DEG-TFP:potential reactive amine sites of about 1:1.17. After reaction, addition of saturated ammonium sodium bicarbonate on ice, and centrifuge, a Mal-LPAAM or Mal-LPAANP having entrapped doxorubicin is recovered.

In certain embodiments, the ratio of the surface modifying component to the potential reactive amine sites of the LPAAMs or LPAANPs is about 1:1 or less, about 1:1.1 or less, about 1:1.2 or less, about 1:1.3 or less, about 1:1.4 or less, about 1:1.5 or less, about 1:1.6 or less, about 1:1.7 or less, about 1:1.8 or less, about 1:1.9 or less, about 1:2 or less, about 1:4 or less, about 1:6 or less, about 1:8 or less, or about 1:10 or less. In other embodiments, the ratio of the surface modifying component to the potential reactive amine sites of the LPAANP is about 1:50 or less, about 1:100 or less, about 1:150 or less, about 1:200 or less, about 1:250 or less, about 1:300 or less, about 1:350 or less, about 1:400 or less, about 1:450 or less, or about 1:500 or less.

LPAAMs or LPAANPs comprising an entrapped component and/or surface modified LPAAMs or LPAANPs of the present invention have been found to be surprisingly effective at targeting and destroying undesirable cells. For example, in some embodiments, the present invention is directed to the destruction of Ramos cells.

The LPAAMs or LPAANPs comprising an entrapped component and/or surface modified LPAAMs or LPAANPs of the present invention have been found to contribute to an increase in the death of undesirable cells (e.g., Ramos cell death) of about 1% or greater, about 2% or greater, about 3% or greater, about 4% or greater, about 5% or greater, about 10% or greater, about 15% or greater, about 20% or greater, about 25% or greater, about 30% or greater, about 35% or greater, about 40% or greater, about 45% or greater, or about 50% or greater as compared to cells not treated with LPAAMs or LPAANPs of the present invention.

The initial release profile of the entrapped component of the LPAAMs or LPAANPs was evaluated. It was found that the initial release profile (i.e. burst release) depended to a certain extent on the species that was entrapped (e.g., small molecule drug, peptide, or peptide amphiphile). Generally, LPAAMs or LPAANPs containing entrapped doxorubicin exhibited a burst release (i.e. percentage release of entrapped species) of from about 10% to about 40%, from about 10% to about 35%, from about 10% to about 30%, or from about 15% to about 30%. Generally, LPAAMs or LPAANPs containing entrapped peptide exhibited a burst release of from about 40% to about 80%, from about 45% to about 80%, from about 45% to about 75%, from about 50% to about 75%, or from about 50% to about 70%. Generally, LPAAMs or LPAANPs containing entrapped peptide amphiphile exhibited a burst release of from about 0.1% to about 15%, from about 0.1% to about 10%, from about 0.1% to about 9%, from about 0.1% to about 8%, from about 0.1% to about 7%, from about 0.1% to about 6%, from about 0.2% to about 6%, from about 0.4% to about 6%, or from about 0.5% to about 5%.

In certain specific embodiments, it was found that an Apt~A-Mal-LPAANP$_{6/54}$ Dox had an appropriate size and anionic surface charge for drug delivery in the blood stream. It was also found that Aptamer C10.36 utilized in an Apt~A-Mal-LPAANP$_{6/54}$ Dox formulation exhibited a high level of aptamer specificity for Ramos cells that was retained after functionalization to the micelle or nanoparticle surface in vitro. Additionally, the aptamer specificity was found to enhance the delivery of doxorubicin entrapped within the LPAANP$_{6/54}$ Dox to Ramos cells. A therapeutic level of doxorubicin was able to be released by such a C10.36~A-Mal-LPAANP$_{6/54}$ Dox formulation, outperforming neat doxorubicin as well as non-specific aptamer formulations. The aptamer-specific association and controlled toxic effect of such a formulation demonstrated the utility of LPAANPs as a class of polymer nanoparticles capable of delivery of a therapeutic molecule.

EXAMPLES

Example 1: NCA Synthesis

An example was conducted to prepare a NCA of an amino acid. The amino acids H$_2$N-lysine(carboxybenzyl)-OH (lysine(Cbz)) (lysine) and H$_2$N-valine-OH (valine) (commercially available from Sigma-Aldrich) were dried for 48 hours under hard vacuum (Welch 8912 direct drive pump) prior to use. Tetrahydrofuran (THF) was dried with molecular sieves for at least 24 hours prior to use. The dried lysine (4 g/14 mmol) or valine (4 g/34 mmol) were added to a 250 mL round bottom flask along with 20 mL of the dried tetrahydrofuran to form a reaction mixture. The reaction mixture was warmed to 55° C. in an oil bath under constant magnetic stirring. A solution of triphosgene was prepared by dissolving triphosgene in 10 mL of tetrahydrofuran and added to the reaction mixture. The solution was prepared at a ratio of 0.5 mmol triphosgene per mmol of amino acid (i.e. lysine or valine). The round bottom flask was capped to allow for the gentle condensing reflux of tetrahydrofuran to rinse the round bottom flask walls.

The Lysine(Cbz) reaction solution became transparent after 45 minutes, and the reaction was stopped after 60 minutes. The valine reaction solution became transparent after 105 minutes, and the reaction was stopped after 120 minutes. Each solution was cooled to room temperature and the solvent was removed by rotary evaporation (e.g., by a Büchi R-205) until approximately 5 mL remained. 100 mL of hexane was then added to the solution.

Crude NCA of each amino acid was precipitated at room temperature within 10 minutes of the addition of the hexane. The hexane solution was decanted and each crude NCA was washed with an additional 50 mL of hexane three times to remove residual triphosgene and tetrahydrofuran. Residual hexane was removed from each round bottom flask by rotary evaporation, followed by drying under high vacuum (Welch 8912 direct drive pump) for 30 minutes. The resulting product was a lysine- or valine-containing LPAA.

An example of the reaction scheme for forming the NCA is set forth below. (a) Lysine(Cbz) and (b) valine NCAs were synthesized as shown using the reaction time stated in the table. Crude and pure yields were determined by weight before and after purification by silica gel column chromatography.

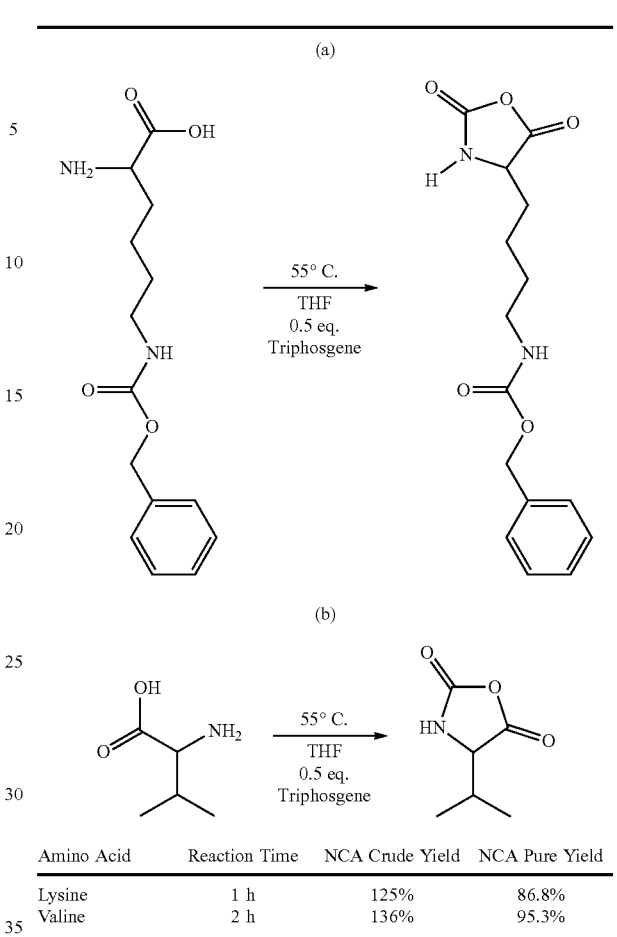

| Amino Acid | Reaction Time | NCA Crude Yield | NCA Pure Yield |
|---|---|---|---|
| Lysine | 1 h | 125% | 86.8% |
| Valine | 2 h | 136% | 95.3% |

Cyclic monomer mixtures with lysine/valine NCA ratios of 30/30, 15/45, 6/54, and 3/57 were formed and the NCA amino acid was then subjected to a ring opening polymerization reaction. The reaction scheme for the ring opening polymerization is shown below. A primary amine acts as an initiator (I), through which a NCA monomer ring is destabilized and attached. This is followed by decarboxylation, which yields a chain end primary amine group. The reaction propagates one NCA at a time until all of the monomers are incorporated into polymer strands. The reaction can be controllably carried out using a solvent mixture (e.g., of dimethylformamide (DMF) and chloroform (CHCl$_3$)) and warming the mixture from 0° C. to room temperature (rt) overnight. In the below reaction scheme, hexadecylamine was used as an initiator.

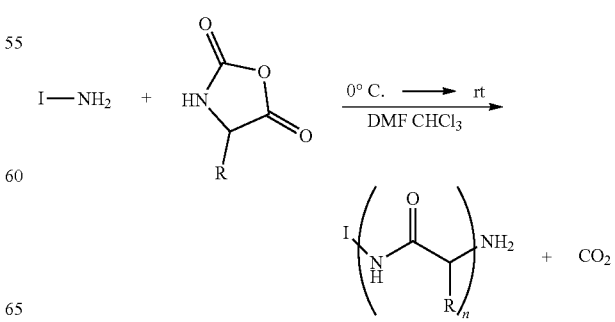

The resulting product of the ring opening polymerization reaction of the NCA amino acid was a LPAA.

Example 2: Deprotection

A further experiment was conducted to remove the carboxybenzyl protection of group of a lysine-containing LPAA. 250 mg of a protected LPAA was dissolved in 2.5 mL of trifluoroacetic acid (TFA) at a concentration of 100 mg/mL in a round bottom flask under continuous magnetic stirring. 0.5 mL of a 33% wt/v solution of HBr in acetic acid was added to facilitate the reaction. After 1.5 hours, 0.5 mL of HBr in ddH$_2$O (48% wt/v solution in distilled, deionized water) was added. Finally, 0.5 mL of HBr in ddH$_2$O was added after 3 hours.

An exemplary reaction scheme for the deprotection process is shown below.

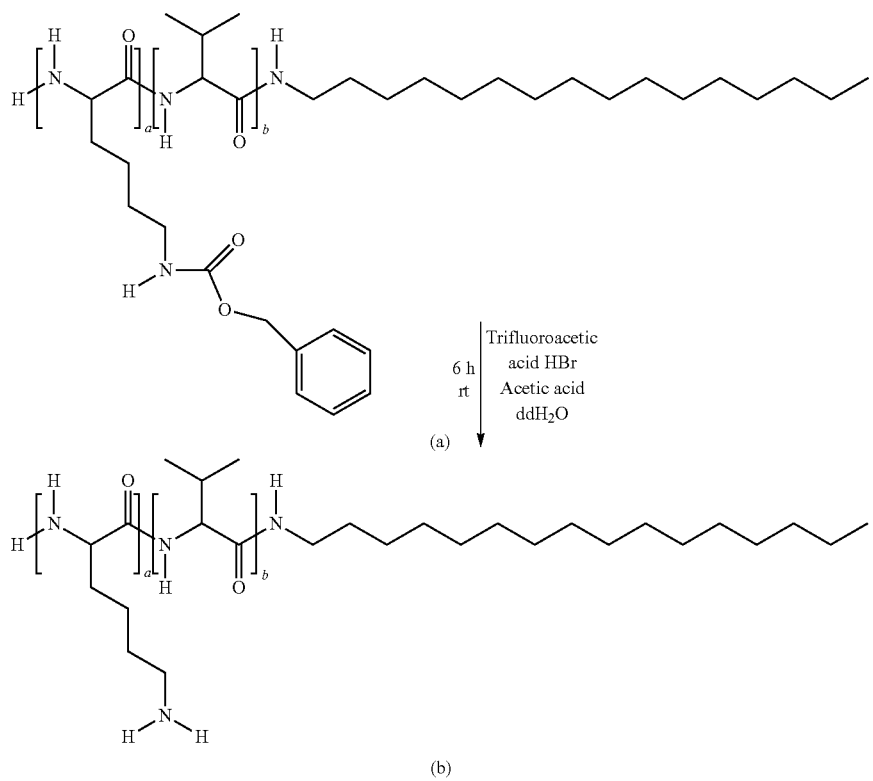

In the above reaction scheme, the carboxybenzyl (Cbz) group on lysine was deprotected to form poly(K(NH$_2$)$_a$V$_b$)C$_{16}$ by hydrobromic acid (HBr) treatment in a mixture of trifluoroacetic acid, acetic acid, and distilled deionized water (ddH$_2$O). After 6 hours of deprotection at room temperature, the reaction was terminated by the removal of the solvent via rotary evaporation until approximately 1 mL remained. The deprotected LPAA was immediately precipitated via the addition of 15 mL of diethyl ether. The precipitated LPAA was then rinsed with an additional 100 mL of diethyl ether using vacuum filtration. The washed precipitated LPAA was dissolved in ddH$_2$O at a ratio of 25 mg/mL and neutralized to a pH of approximately 7 via dropwise addition of 1 M sodium hydroxide (monitored with pH paper). The neutralized solution was frozen and lyophilized using a Labconco FreeZone 4.5 for future use.

Example 3: Evaluation of the LPAA

Protected LPAA was dissolved in a solution of 2.5% deuterated trifluoroacetic acid (d-TFA) in deuterated chloroform (CDCl$_3$), at a ratio of 1 mg/mL. A 250 μL portion of this solution was evaluated in a 3 mm NMR tube at 25° C. using an NMR spectrometer (Bruker Avance III 600 MHz) equipped with a cryoprobe. Adequate signal attenuation was assured for each sample via repeated analyses of the signal. The signal strength was compared for 5% and 95% gradient strength to assure that at least 95% of signal attenuation was obtained. Both the diffusion time and gradient length were adjusted as necessary. For a single diffusion ordered spectroscopy (DOSY) acquisition, sixteen proton ($^1$H) NMR spectra were taken and compiled into a 2-D DOSY plot using Bruker NMR Software. The LPAA diffusion coefficients were determined by plotting the diffusivity against the chemical shift. The LPAA was identified by comparing the results to the expected ppm of the functional groups (including Cbz and hexadecylamine). Known molecular weights of polystyrene (commercially available, e.g., in an Agilent GPC/SEC Standard Calibration Kit) were also evaluated by NMR DOSY using the same procedure. A standard curve of diffusivity versus known molecular weights of polystyrene was used to determine the molecular weights of the LPAAs from the experimentally determined diffusion coefficients. This procedure was completed for three independently produced batches of each LPAA, to determine an approximate average molecular weight.

The protected LPAAs were also evaluated to assess their relative lysine and valine content. Protected LPAAs were dissolved in deuterated dimethyl sulfoxide (DMSO-d6) at a concentration of 10 mg/mL. A 250 μL portion of this solution was evaluated in a 3 mm NMR tube at 25° C. to generate $^1$H NMR spectrum, employing a 600 MHz NMR. A representative $^1$H NMR spectrum of the strategy used to determine lysine/valine ratios is provided in FIG. 1. The integration peaks from 3.5-4.5 ppm and 3 ppm represented the α-carbon backbone hydrogens of lysine and value, respectively. The integration peak at 7-7.5 ppm corresponded to the 2 aliphatic hydrogens on the carbon adjacent to the Cbz ring. Lysine/valine ratios were assessed for each LPAA from three independently produced batches by the relationship of the integration peaks.

The Measured molecular weights of protected LPAAs closely align with the expected values, as shown in the below table. Additionally, the lysine/valine ratio of each LPAA followed a similar trend as the expected ratio. Each value shown is the average of three independently produced batches of LPAA for each formulation.

TABLE 1

| LPAA | Log Diffusivity ($\log_{10}(m^2/s)$) | Measured Molecular Weight (Da) | Expected Molecular Weight (Da) | % Difference |
|---|---|---|---|---|
| Poly($K_{30}V_{30}$)$C_{16}$ | 9.51 ± 0.09 | 10300 ± 4000 | 11100 | −7% |
| Poly($K_{15}V_{45}$)$C_{16}$ | 9.45 ± 0.07 | 7500 ± 2200 | 8600 | −14% |
| Poly($K_6V_{54}$)$C_{16}$ | 9.39 ± 0.12 | 5900 ± 3600 | 7200 | −27% |
| Poly($K_3V_{57}$)$C_{16}$ | 9.44 ± 0.08 | 7200 ± 2400 | 6200 | +8% |

| LPAA | Measured Lysine/Valine Ratio | Expected Lysine/Valine Ratio |
|---|---|---|
| Poly($K_{30}V_{30}$)$C_{16}$ | 0.95 ± 0.11 | 1 |
| Poly($K_{15}V_{45}$)$C_{16}$ | 0.48 ± 0.09 | 0.33 |
| Poly($K_6V_{54}$)$C_{16}$ | 0.20 ± 0.12 | 0.11 |
| Poly($K_3V_{57}$)$C_{16}$ | 0.055 + 0.022 | 0.053 |

Figure 2:
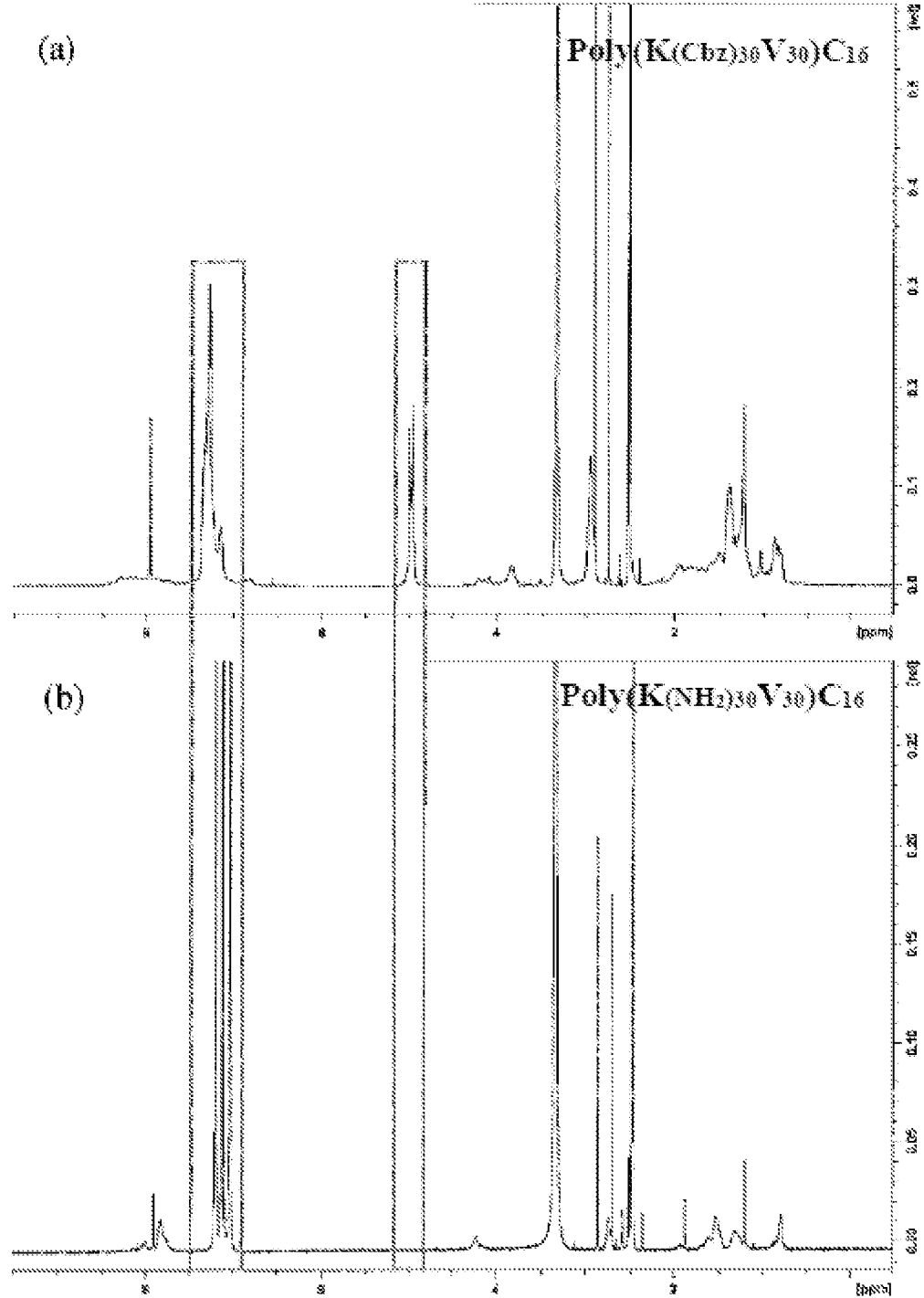
FIG. 2 shows the NMR spectra of (a) Cbz-protected LPAAs and (b) deprotected LPAAs.

The deprotected LPAAs of Example 2 were also dissolved in DMSO-d6 at a concentration of 10 mg/mL and evaluated using the same procedure as described above. The hydrogen peaks from the Cbz ring at 7.2 ppm and —CH$_2$— peak adjacent to the Cbz ring at 5 ppm were assessed to confirm deprotection. NMR spectra was taken for each LPAA to assure deprotection. The results of this NMR analysis is shown in FIG. 2, with (a) representing the results before deprotection and (b) representing the LPAAs after Cbz deprotection. The results of this NMR indicated that the side group deprotection reaction successfully resulted in acceptable LPAAs.

Example 4: Critical Micelle Concentration (CMC)

In a further experiment, LPAAs were found to self-assemble into micelles (i.e. forming LPAAMs). The critical micelle concentration (CMC), or minimum concentration at which LPAAs self-assemble to form LPAAMs, was assessed. LPAAs were dissolved in a phosphate buffered saline (PBS) solution having a pH of 7.4 at a concentration of 100 g/mL. The dissolved solution was serially diluted in 1 M of 1,6-Diphenyl-1,3,5-hexatriene (DPH). Each sample was incubated at room temperature for 1 hour. The DPH fluorescence was measured using a BioTek Cytation 5 plate reader with an excitation/emission of 350/428 nm. DPH has been shown to stack within hydrophobic pockets, such as the core of a micelle, dramatically increasing its fluorescence. Therefore, DPH fluorescence was used as an approximation for micelle formation. Measurements were taken in triplicate, from three independently produced LPAAs of each lysine/valine ratio. When plotting the fluorescence against the logarithmic concentration, the inflection point in fluorescence was taken as the CMC value. The results are set forth below. All LPAAs possessed CMCs from 1.1-4.2 µg/mL indicating LPAAM formation.

TABLE 2

| LPAANP Formulation | Doxorubicin release % in DMSO |
|---|---|
| Poly($K_{30}V_{30}$)$C_{16}$ NP | 110 ± 11% |
| Poly($K_{15}V_{45}$)$C_{16}$ NP | 81 ± 13% |
| Poly($K_6V_{54}$)$C_{16}$ NP | 92 ± 12% |
| Poly($K_3V_{57}$)$C_{16}$ NP | 49 ± 20% |

The micelle morphology was further assessed via transmission electron microscopy (TEM). A 5 µL sample at a concentration of 1 mg/mL in a phosphate buffered saline solution was incubated on a carbon-coated copper grid (Pelco 200 mesh) for 5 minutes, followed by wicking with filter paper and treatment with 5 µL of a NanoW negative stain. Following 5 minutes of stain treatment, the samples were wicked until dry. Both wicking steps were completed using a deep staining method, wherein the filter paper was applied to the bottom of the grid and sample/stain solution drawn through the grid. Samples were then evaluated via JEOL JEM-1400 TEM with micrographs captured at 120 keV. TEM micrographs were taken for three independent batches of LPAA of each lysine/valine ratio. Micrographs were then further analysed to determine LPAA particle size using Bruker ESPRIT 2.0 particle analysis software package.

Figure 3:
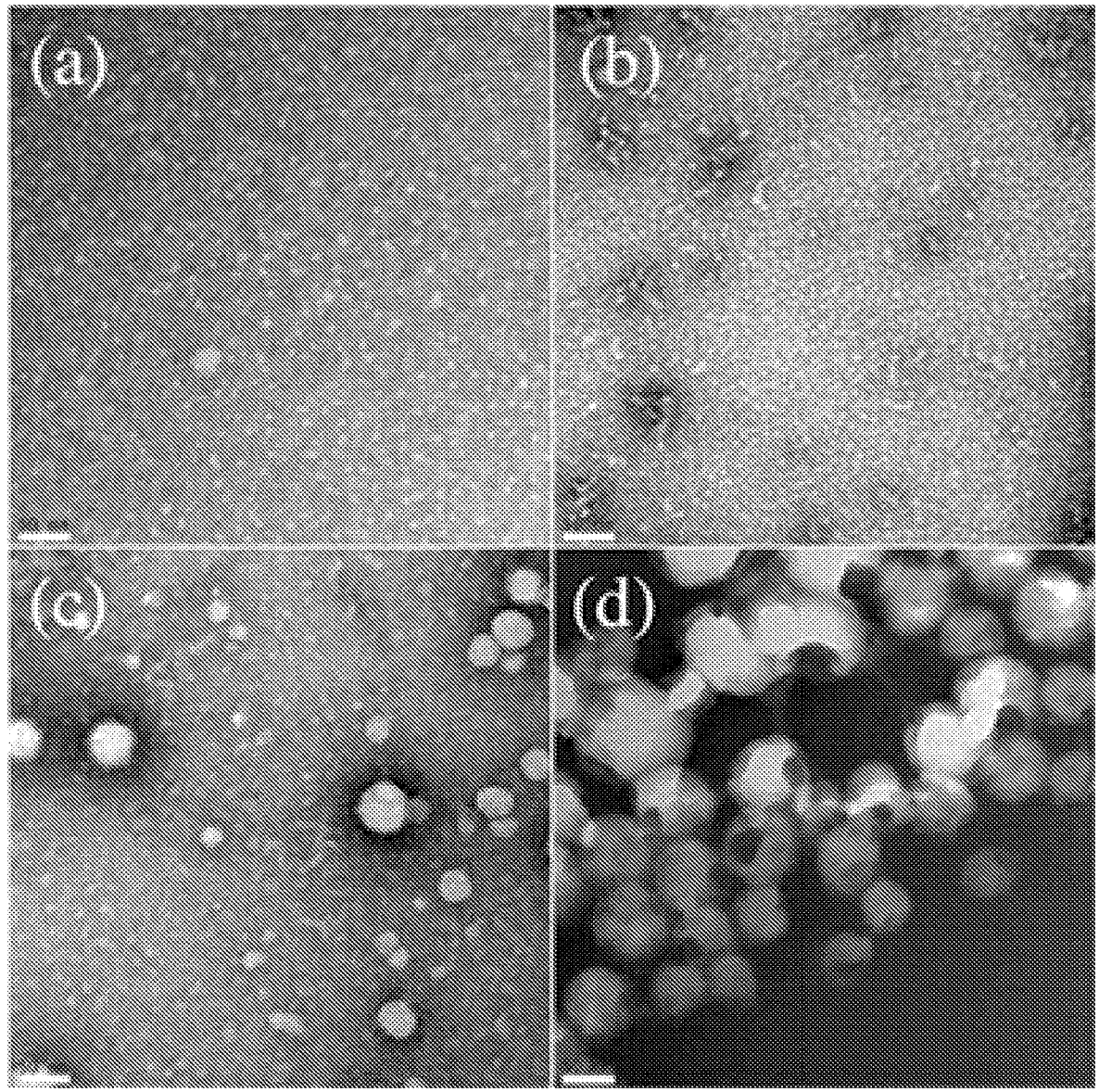
FIG. 3 shows TEM micrographs for (a) Poly($K_{30}V_{30}$)$C_{16}$, (b) Poly($K_{15}V_{45}$)$C_{16}$, (c) Poly($K_6V_{54}$)$C_{16}$, and (d) Poly ($K_3V_{57}$)$C_{16}$. All scale bars are 50 nm.

FIG. 3 presents a TEM micrograph for (a) Poly($K_{30}V_{30}$)$C_{16}$, (b) Poly($K_{15}V_{45}$)$C_{16}$, (c) Poly($K_6V_{54}$)$C_{16}$, and (d) Poly($K_3V_{57}$)$C_{16}$. This figure shows that each poly(amino acid) self-assemble in a phosphate buffered saline solution into nanostructures (i.e., LPAAMs), thus demonstrating the versatility of various chemistries to self-assemble into micellar nanoparticles. The more hydrophilic LPAAs formed smaller nanostructures than the hydrophobic LPAAs (c) and (d). In FIG. 3, each scale bar represents 50 nm.

Figure 4A:
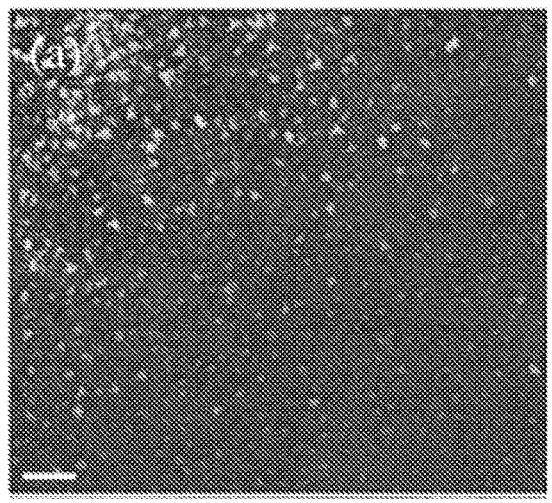
FIGS. 4(a), (c), (e), (g), (i), (k), (m), and (o) present micrographs and Figures (b), (d), (f), (h), (j), (l), (n), and (p) graphically demonstrate the particle size distribution of each micrograph, respectively. Micrograph scale bars are 50 nm except where noted.
Figure 4B:
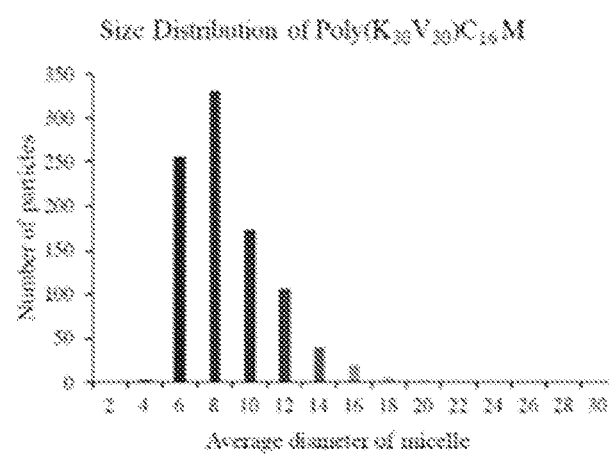
FIG. 4 provides further TEM micrographs and image-based size analysis for LPAA micelles and nanoparticles.
Figure 4C:
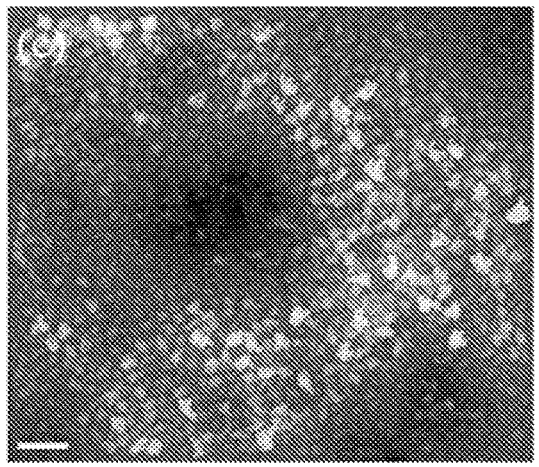
Figure 4D:
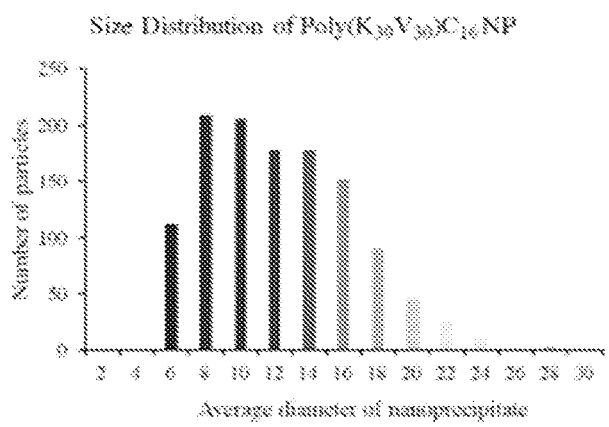
Figure 4E:
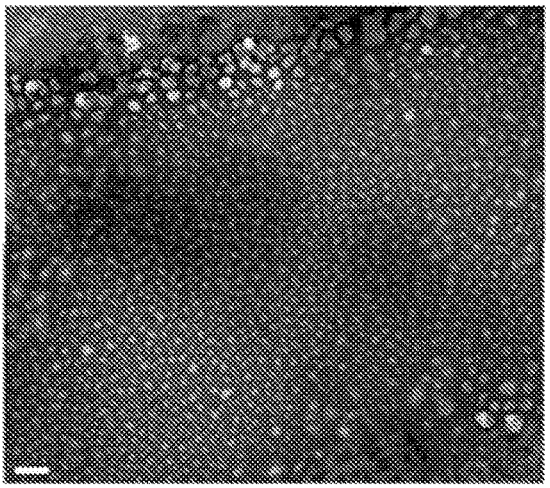
Figure 4F:
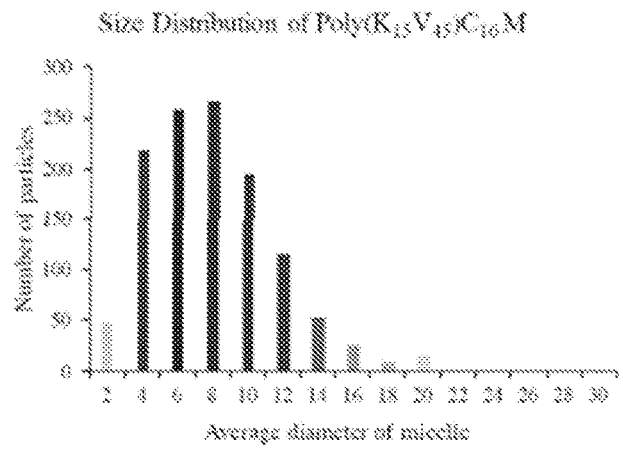
Figure 4G:
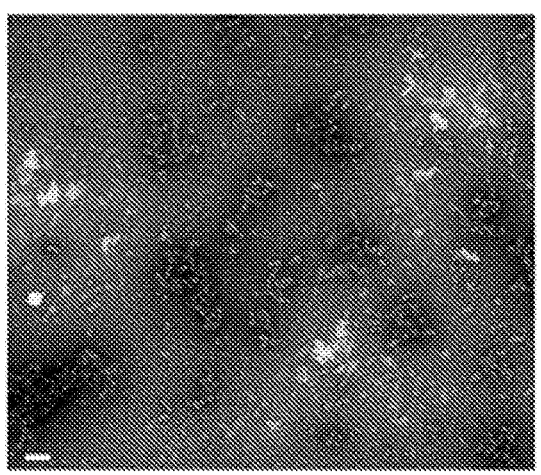
Figure 4H:
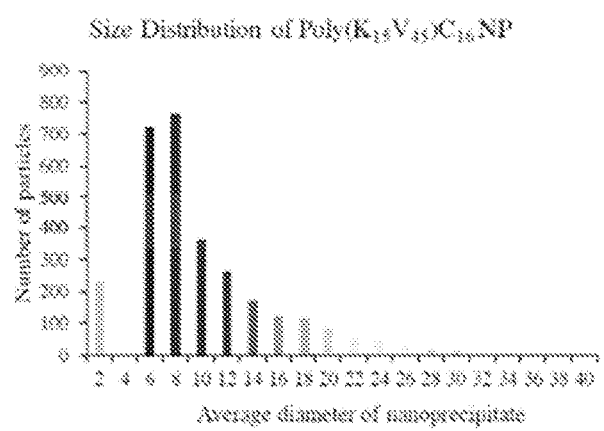
Figure 4I:
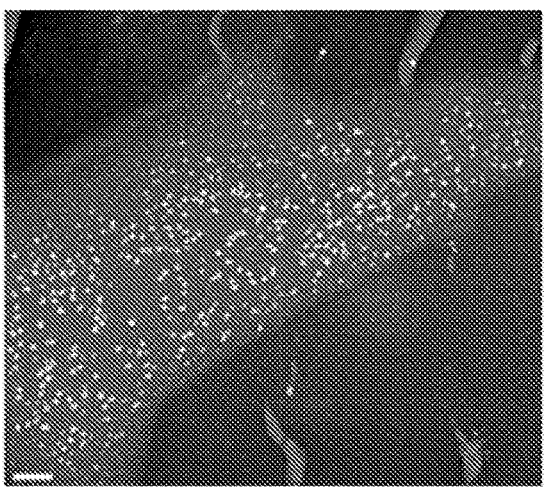
Figure 4J:
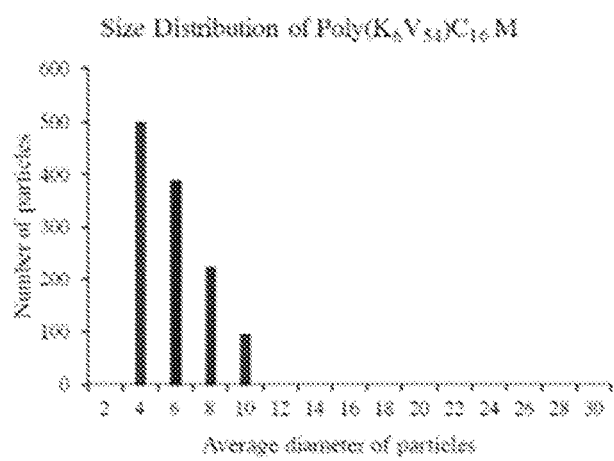
Figure 4K:
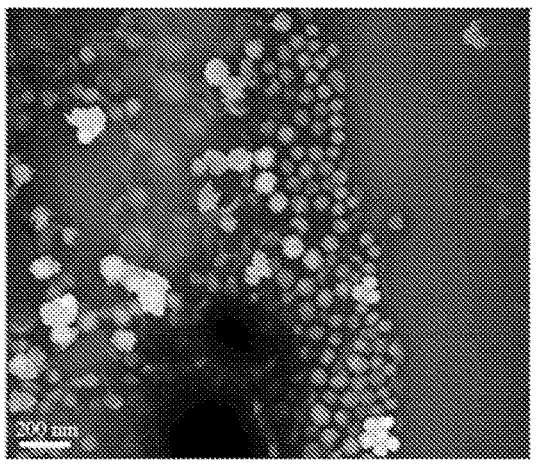
Figure 4L:
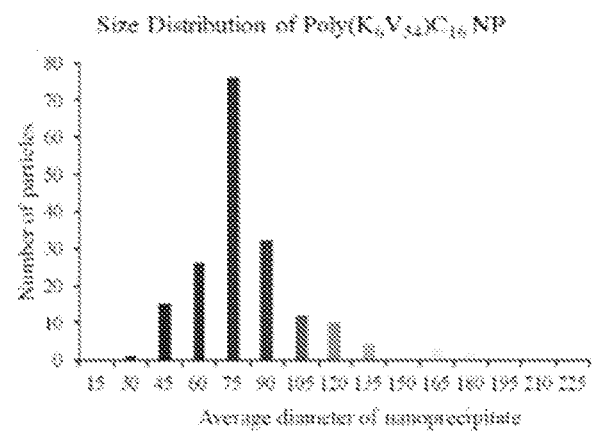
Figure 4M:
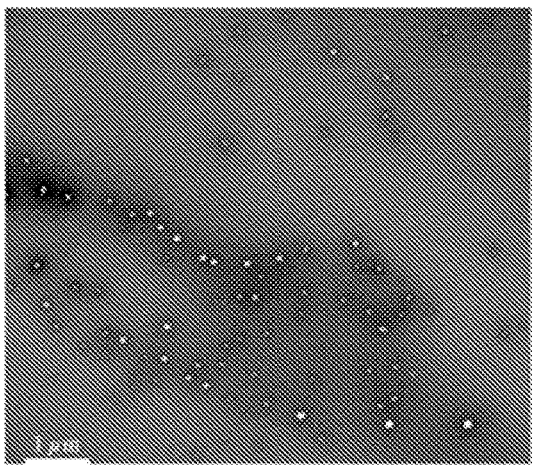
Figure 4N:
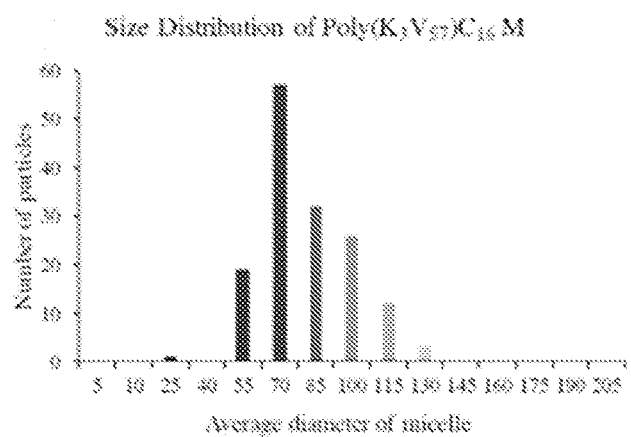
Figure 4O:
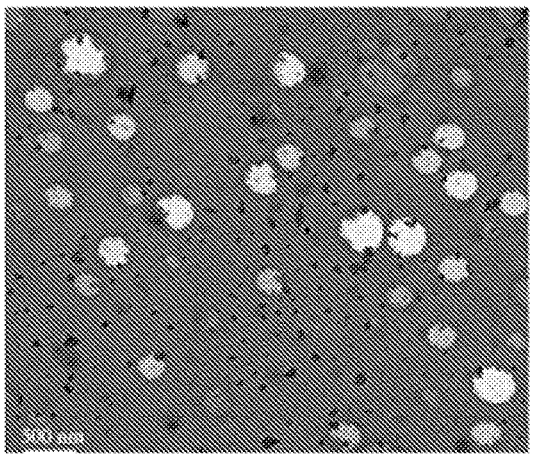
Figure 4P:
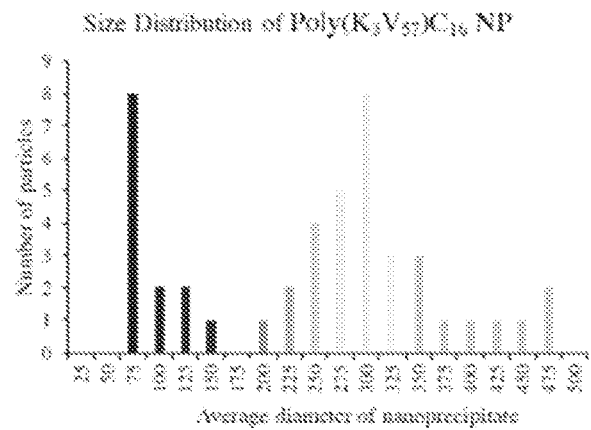

Further TEM micrographs are set forth in FIGS. 4(a), (c), (e), (g), (i), (k), (m), and (o) present micrographs and Figures (b), (d), (f), (h), (j), (l), (n), and (p) graphically demonstrate the particle size distribution of each micrograph. Micrograph scale bars are 50 nm except where noted.

Example 5: Nanoprecipitation to Form LPAA Nanoparticles (LPAANPs)

A further experiment was conducted to form LPAA nanoparticles (i.e. LPAANPs). LPAAs were dissolved in dimethylformamide at a concentration of 10 mg/mL with the assistance of 5 minutes of sonication, employing a bath sonicator (Fisher FS30). A mixture of 10% octanol and 90% pentane was prepared for use in the nanoprecipitation process. The LPAA solution was added dropwise to 25 mL of the mixture of octanol and pentane in a 50 mL ultracentrifuge tube under constant stirring. After 5 minutes of stirring, the combination was subjected to ultracentrifugation at 20,000 g for 20 minutes (e.g., using a Thermo Sorvall Lynx 6000) to sediment the resulting LPAA nanoparticles (LPAANPs). After centrifugation, the solution was decanted and an additional 10 mL of pentane was added to remove any residual dimethylformamide and/or octanol. Following an additional centrifugation cycle and decantation, the pentane rinse was repeated two additional times. The resulting LPAANPs were then dried under high vacuum for 1 hour and stored at room temperature in the dark until used. Each nanoparticle batch (LPAANP) resulted in a good overall yield, with an average for all formulations of 78%±8%.

An image size analysis program was utilized to assess the average diameter of each LPAAM (i.e. formed in Example 4) and LPAANP batch. The compilation of this TEM-based data is shown below in Table 3. LPAANPs were found to contain larger nanostructures than LPAAMs regardless of chemistry. The more hydrophilic LPAAs, Poly($K_{30}V_{30}$)$C_{16}$ and Poly($K_{15}V_{45}$)$C_{16}$, were found to yield nanostructures in small diameter regardless of fabrication method. The modestly hydrophobic Poly($K_6V_{54}$)$C_{16}$ formed small LPAAMs, but larger LPAANPs. Poly($K_3V_{57}$)$C_{16}$, formed larger LPAAMs and LPAANPs.

TABLE 3

| LPAA | Micelle Diameter (nm) | Nanoprecipitate Diameter (nm) |
| --- | --- | --- |
| Poly($K_{30}V_{30}$)$C_{16}$ | 6.8 ± 3.6 | 12 ± 8 |
| Poly($K_{15}V_{45}$)$C_{16}$ | 5.9 ± 3.0 | 17 ± 26 |
| Poly($K_6V_{54}$)$C_{16}$ | 6.2 ± 5.4 | 79 ± 34 |
| Poly($K_3V_{57}$)$C_{16}$ | 73 ± 21 | 190 ± 110 |

Example 6: Fibroblast Toxicity of LPAAMs and LPAANPs

An experiment was conducted to test the fibroblast toxicity of LPAAMs and LPAANPs. 3T3 fibroblasts (ATCC L929) were cultured in Dulbecco's Modified Eagle's Medium (DMEM), supplemented with 10% fetal bovine serum (FBS) and penicillin-streptomycin, using 75 cm² cell culture flasks at 37° C. in a humidified incubator at 5% atmospheric $CO_2$, as per ATCC protocols. The media was changed every 3 days to remove waste and supply new nutrients. Fibroblasts were harvested near complete confluency. The cells were counted and seeded in clear, sterile 96 well plates with a concentration of 5,000 cells/well in 100 µL of media. Fibroblast cells were further cultured for 48 hours prior to the addition of any material for toxicity testing.

Stock solutions of each particle type (i.e. LPAAMs and LPAANPs) were prepared at 10,000, 5,000, 2,000, 1,000, 500, 100, and 0.0 µg/mL. 11 µL of each treatment was added to the incubating cells for a final concentration of 1,000, 500, 200, 100, 50, 10 and 0.0 g/mL in a phosphate buffered saline solution and media and cultured for 24 hours. Following treatment, the media from each well was emptied, with care taken to not disturb the adherent cells. Each well was rinsed twice with 100 µL of a phosphate buffered saline solution, followed by the addition of 100 µL of 1% Triton X-100 in dd$H_2O$. The cells were then subjected to three freeze-thaw cycles to lyse the cells and release their intracellular components. All cell processing was completed using proper sterile technique. Cell culture and treatment with each formulation was completed in triplicate.

After 24 hours of inoculation, a Quant-iT™ PicoGreen dsDNA kit (Invitrogen) was used to assess the number of 3T3 fibroblasts present, and to measure the DNA content. Following the freeze-thaw cycles, 5 µL of each treatment group was added to 95 µL of a TE buffer solution (10 mM tris(hydroxymethyl)aminomethane and 1 mM ethylenediaminetetraacetic acid) having a pH of 7.5 in a black 96-well plate. A PicoGreen solution (100 µL of 1× PicoGreen reagent in TE) was prepared and added to each well. The plate was then incubated in the dark at room temperature for 5 minutes followed by fluorescent quantification using an excitation/emission of 485/520 nm (BioTek Cytation5 spectrofluorometric plate reader). A DNA content/cell number standard curve was generated by lysis of a known concentration of cells (1,000,000 cells in 100 µL of 1% Triton-X100 in dd$H_2O$) followed by serial dilution and DNA quantification using the same protocol as for the experimental samples. Each assay was completed in triplicate.

Similarly, the ATP content was evaluated and compared to a standard curve to assess the metabolic health of NIH 3T3 fibroblasts exposed to each experimental group. 10 µL of each cell lysis sample was added to 90 µL of a phosphate buffered saline solution to dilute the 1% Triton X-100 to 0.1%. 25 µL of this solution was added to a 384-well white plate. 25 µL of a Cellglo Buffer made from the CellTiter-Glo Luminescent Cell Viability Assay (Promega) was then added to each well. Samples were shaken for 2 minutes, the plate incubated at room temperature for 10 minutes, and then the luminescence was measured with a BioTek Cytation5 spectrofluorometric plate reader. Care was taken to prevent bubbles from forming during this process. An ATP standard curve was prepared by serial dilution of a 10 M ATP standard from 1000 nM to 0.1 nM and measurement of the luminescence. Each assay was completed in triplicate.

Figure 5A:
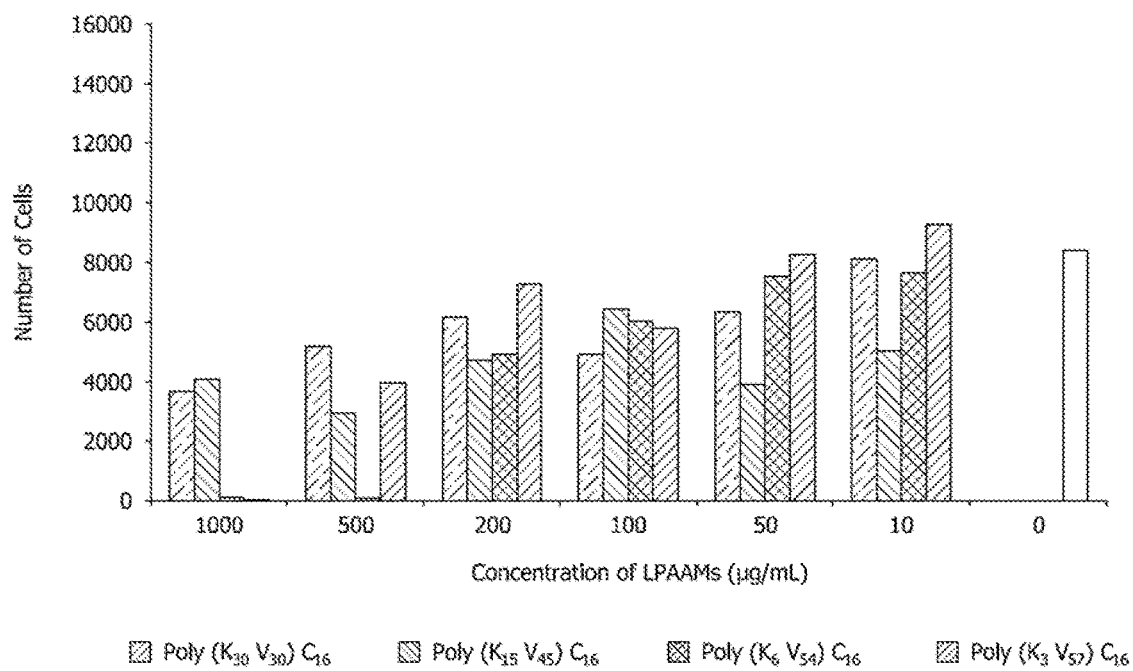
FIGS. 5A-5D detail LPAA micelle (LPAAM) and LPAA nanoparticle (LPAANP) cell toxicity where NIH 3T3 fibroblasts were analysed for cell count (FIGS. 5A and 5B) and cell count and ATP content (FIGS. 5C and 5D).
Figure 5B:
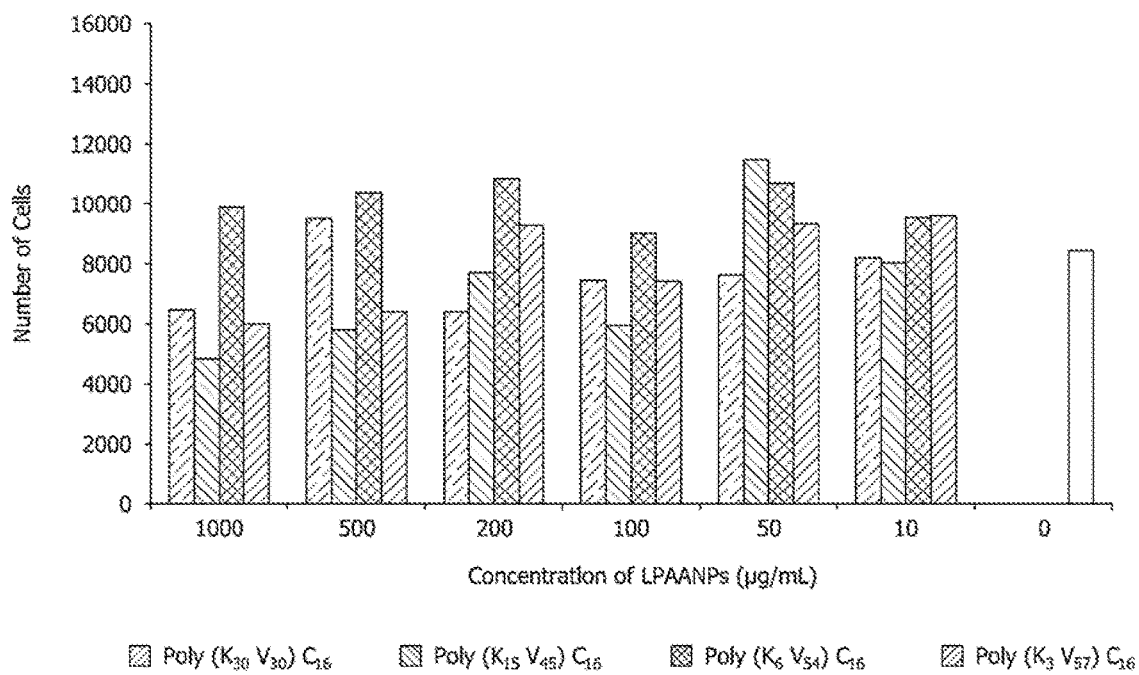
Figure 5C:
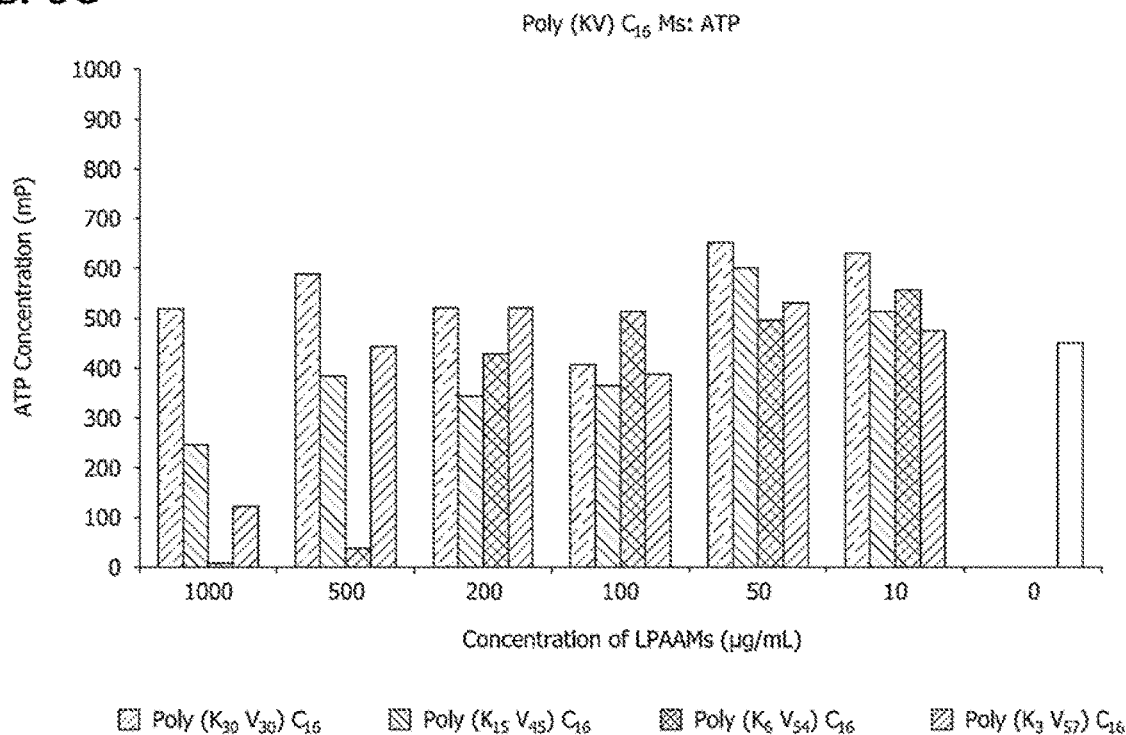
Figure 5D:
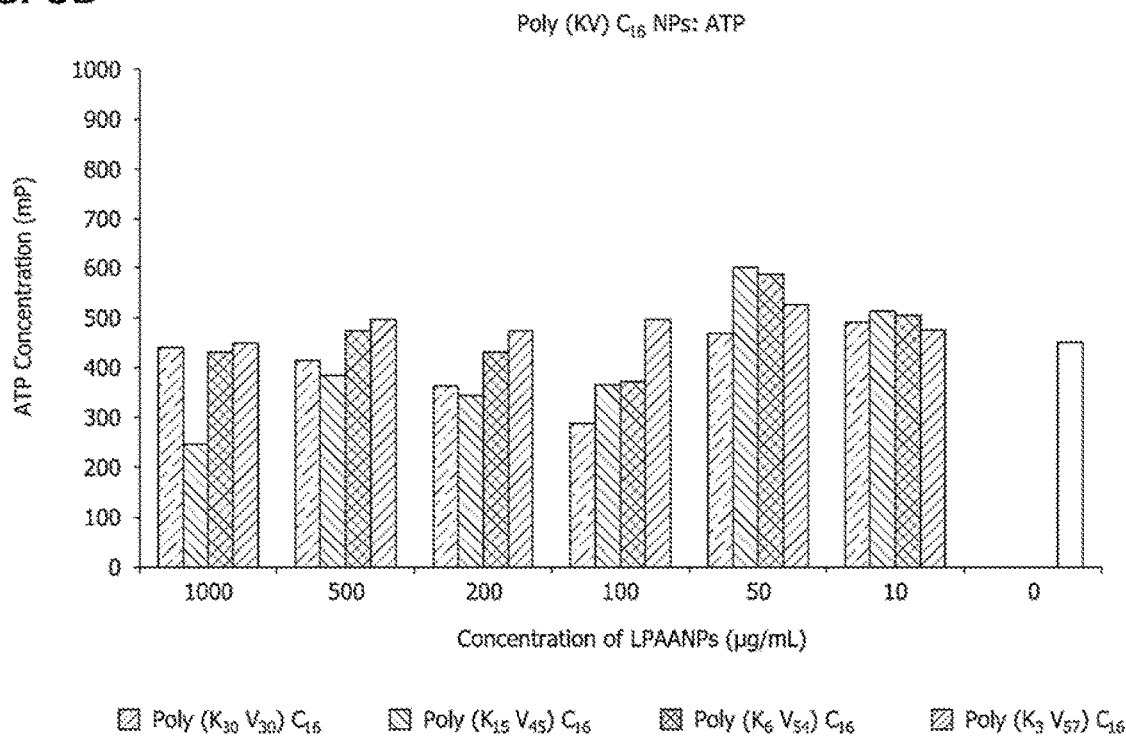

The results of the DNA and ATP analysis are set forth in FIGS. 5A-5D. As shown in FIGS. 5A and 5C, both the number of cells and ATP concentration were reduced at 1000 µg/mL for Poly($K_{30}V_{30}$)$C_{16}$ Ms and at 500 and 1000 µg/mL for Poly($K_{15}V_{45}$)$C_{16}$ Ms. For LPAANPs, no toxic affect was observed for any chemistry up to 1000 µg/mL maximum concentration tested (see FIGS. 5B and 5D).

Example 7: Peptide, Peptide Amphiphile, and Doxorubicin Entrapment

An experiment was conducted to entrap certain components in a LPAA nanoparticle. In particular, the capacity for LPAANPs to be able to entrap doxorubicin (Dox), peptide (P), and peptide amphiphile (PA) was explored.

5(6)-Carboxyfluorescein (FAM)-labeled peptide (FAM-GRKKRRQRRRPPRPDRKLEVFEKEFLRMELGERC) (SEQ ID NO: 2) and Fam-labeled peptide amphiphile (Palm$_2$KK(FAM)-RPDRKLEVFEKEFLRMELGER) (SEQ ID NO: 1) were synthesized on a Tetras peptide synthesizer (Advanced ChemTech) using a standard orthogonal fluorenylmethyloxycarbonyl (Fmoc) protection strategy with hexafluorophosphate benzotriazole tetramethyl uronium (HBTU)-mediated amino acid conjugations supplemented with hydroxybenzotriazole (HOBt) and N,N-diisopropylethylamine (DIEA). Fmoc deprotection was completed by treatment with 25% piperidine in dimethylformamide. For fluorescent labeling of the peptide, FAM was conjugated after HBTU activation to the N' peptide amino group. For peptide amphiphile FAM labeling, orthogonal protection of a lysine side chain via 1-(4,4-dimethyl-2,6-dioxocyclohexylidene)ethyl (Dde) was used during Fmoc-Lysine(Fmoc)-OH and palmitic acid couplings. After palmitic acid coupling via HBTU activation, Dde was removed by 2% v/v hydrazine in dimethylformamide. FAM was then conjugated to the lysine side chain of the peptide amphiphile on resin using standard HBTU chemistry. Following on resin synthesis, cleavage was completed using trifluoroacetic acid with scavengers (2.5% v/v of water, triisopropyl silane, thioanisole, and ethanedithiol supplemented with 2.5% w/w phenol) followed by diethyl ether precipitation.

Peptide (P) and peptide amphiphile (PA) were purified to >95% via mass spectrometry controlled high pressure liquid chromatography (LC/MS) using a Waters System Gold chromatograph equipped with an in-line mass spectrum analyzer (Thermo Orbitrap). Doxorubicin (Dox) was purchased from Selleck Chemicals, stored at −20° C. in accordance with supplier recommendations, and used as received.

Prior to nanoprecipitation, the peptide (P), peptide amphiphile (PA), and Dox were dissolved in dimethylformamide at 10 mg/mL. Each of these were individually mixed with a 10 mg/mL LPAA solution and immediately nanoprecipitated using the protocol described in Example 5. A weight ratio of entrapped species:LPAA of about 1:9 was used for each formulation. After nanoprecipitation and the first centrifugation cycle, a portion of the 10% octanol/90% pentane supernatant solution was retained for assessment of co-precipitation yield. The peptide (P)-, peptide amphiphile (PA)-, and Dox-containing LPAANPs were processed post-nanoprecipitation identically to the LPAANPs as previously described.

Co-precipitation efficiency of the peptide (P), peptide amphiphile (PA), and Dox was evaluated by measuring the fluorescence of the nanoprecipitation supernatant. After the first centrifugation of the nanoprecipitate process, 250 µL of the supernatant was pipetted into a microcentrifuge tube, and the pentane was allowed to evaporate overnight in the dark. 10 µL of the supernatant solution was then added to 65 µL of dimethyl sulfoxide. The fluorescence of the resultant solution was evaluated in a 96-well black plate at either excitation/emission of 495/520 nm (P and PA) or 500/600 nm (Dox). A BioTek Cytation5 spectrofluorometric plate reader was utilized and the fluorescence of each sample was compared to standard curves of each material produced by the addition of the peptide (P), peptide amphiphile (PA), or Dox to a solution of 10% octanol in pentane followed by overnight evaporation and serial dilution into dimethyl sulfoxide.

For Dox release efficiencies, 2.5 µL of nanoparticles of each doxorubicin-containing polymer was diluted from 1 mg/mL in a phosphate buffered saline solution into 97.5 µL of dimethyl sulfoxide. The fluorescence of 75 µL of this solution was measured and the value compared to standard curves of Dox produced in the same solvent (i.e. 2.5% phosphate buffered saline solution in dimethyl sulfoxide). The release kinetics in a phosphate buffered saline solution were evaluated by suspending nanoparticles of each formulation with each entrapped species in a phosphate buffered saline solution at 1 mg/mL. Aliquots from each solution were taken throughout incubation at 37° C. The released material from each aliquot was separated from the nanoparticles using a 50 kDa molecular weight cutoff filtration. The fluorescence of the filtrate was evaluated and compared with standard samples of each entrapped material in a phosphate buffered saline solution. Aliquots were taken at 0, 3, 6, 12, 24, and 72 hours for P and PA and at 0, 24, and 72 hours for Dox.

Figure 6:
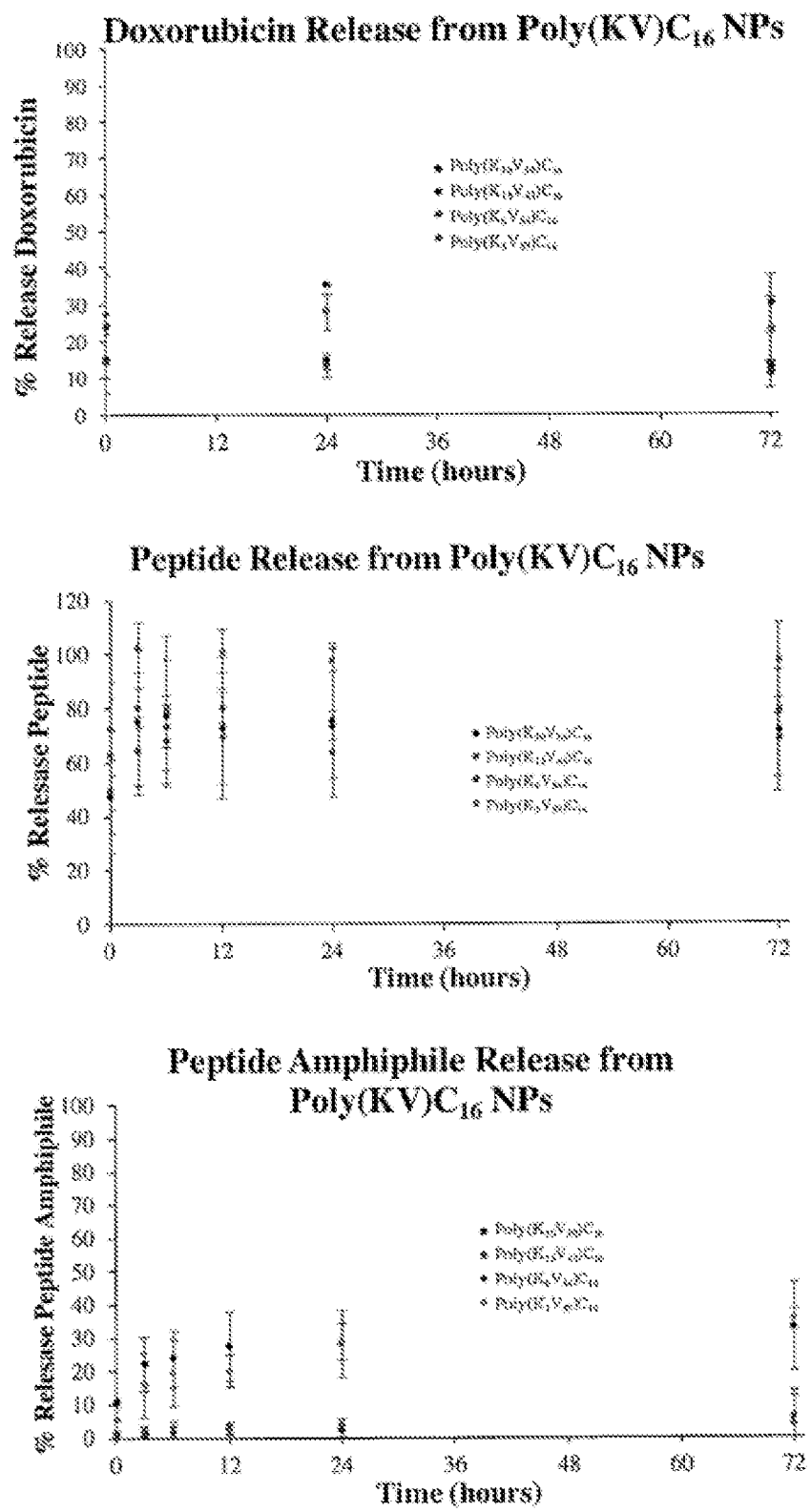
FIG. 6 shows the release profiles of doxorubicin (Dox), peptide (P), and peptide amphiphile (PA) loaded LPAANPs.

The release profiles of the doxorubicin (Dox)-, peptide (P)-, peptide amphiphile (PA)-loaded LPAANPs are set forth in FIG. 6.

The results of the Dox release efficiency in DMSO are set forth below in Table 4. Dox was found to have reasonable release efficiencies regardless of formulation chemistry.

TABLE 4

| LPAANP Formulation | Doxorubicin release % in DMSO |
|---|---|
| Poly($K_{30}V_{30}$)$C_{16}$ NP | 110 ± 11% |
| Poly($K_{15}V_{45}$)$C_{16}$ NP | 81 ± 13% |
| Poly($K_{6}V_{54}$)$C_{16}$ NP | 92 ± 12% |
| Poly($K_{3}V_{57}$)$C_{16}$ NP | 49 ± 20% |

The drug association efficiency were >97% regardless of LPAA formulation chemistry and entrapped species. The immediate release, or burst release, of each payload was also evaluated. Over 72 hours of incubation in a phosphate buffered saline solution, no further release beyond this burst was observed for Dox and P. PA did slowly reach approximately 40% release over three days for two formulations (Poly($K_{30}V_{30}$)$C_{16}$ nanoparticles and Poly($K_{3}V_{57}$)$C_{16}$) nanoparticles, whereas no extended payload release kinetics were found for Poly($K_{15}V_{45}$)$C_{16}$ nanoparticles and Poly($K_{6}V_{54}$)$C_{16}$ nanoparticles.

The association efficiency and burst release of the LPAANPs and the associated species are set forth below in Table 5.

TABLE 5

| LPAANP | Associated Species | Association Efficiency | % Burst Release of Entrapped Species |
|---|---|---|---|
| Poly($K_{30}V_{30}$)$C_{16}$ NP | Doxorubicin | 97.8 ± 0.2% | 15 ± 9% |
| | Peptide | 100.1 ± 0.1% | 47 ± 13% |
| | Peptide amphiphile | 99.9 ± 0.3% | 10 ± 1% |
| Poly($K_{15}V_{45}$)$C_{16}$ NP | Doxorubicin | 97.6 ± 0.2% | 24 ± 14% |
| | Peptide | 100.0 ± 0.1% | 63 ± 21% |
| | Peptide amphiphile | 100.1 ± 0.2% | 1.2 ± 0.7% |
| Poly($K_{6}V_{54}$)$C_{16}$ NP | Doxorubicin | 98.3 ± 0.3% | 14 ± 8% |
| | Peptide | 100.0 ± 0.0% | 49 ± 22% |
| | Peptide amphiphile | 100.0 ± 0.1% | 0.1 ± 0.4% |
| Poly($K_{3}V_{57}$)$C_{16}$ NP | Doxorubicin | 99.0 ± 0.1% | 27 ± 7% |
| | Peptide | 99.9 ± 0.1% | 72 ± 17% |
| | Peptide amphiphile | 99.9 ± 0.3% | 5 ± 3% |

Example 8: Nanoparticle Surface Modification

Dox-entrapped Poly($K_{6}V_{54}$)$C_{16}$ nanoparticles (i.e. LPAANP$_{6/54}$ Dox) were surface modified to display cell-targeting aptamer. Maleimide-diethyleneglycol-tetrafluorophenol ester (Mal-DEG-TFP) (commercially available from Quanta Biodesign) was stored at −20° C. until use. Mal-DEG-TFP was dissolved in ddH$_2$O at 10 mM with the aid of bath sonication for 10 minutes. 0.1 mg of LPAANP$_{6/54}$ Dox was suspended in a 100 mM sodium bicarbonate at a concentration of 1 mg/mL in a microcentrifuge tube. Mal-DEG-TFP (10 µL of the 10 mM stock solution in ddH$_2$O) was then added, for a final concentration of 0.9 mM Mal-DEG-TFP. This resulted in a ratio of Mal-DEG-TFP: potential reactive amine sites of 1:1.17 (assuming an average molecular weight of 7,000 Da per Poly($K_{6}V_{54}$)$C_{16}$). The reaction was allowed to proceed for 1 hour, followed by the addition of 500 µL of saturated ammonium sodium bicarbonate (ASB) (approximately 1 M) on ice. After 10 minutes of incubation on ice, the solution was centrifuged at 20,000 g for 20 min to sediment the Mal-LPAANP$_{6/54}$ Dox and for particle isolation from unreacted Mal-DEG-TFP and tetrafluorophenol. The supernatant was then discarded and the pellet rinsed with two additional cycles of 500 μL saturated ASB addition, subjected to centrifugation, and decanted.

TEM was utilized to evaluate any gross structural changes from surface modification. No differences were seen for each surface modification compared to unmodified LPAANP$_{6/54}$ Dox.

Example 9: Surface Decoration with Antitail and Aptamer

DNA antitail (A), C10.36-tail (NHL-specific aptamer), G24A-tail (point mutant specificity control for C10.36), and scApt-tail (or scDW4, a non-targeting DNA aptamer) (i.e. commercially available from Integrated DNA Technologies) with sequences listed in the below table were used in a further surface modification experiment.

TABLE 6

| | |
|---|---|
| C10.36 | CTAACCCCGGGTGTGGTGGGTGGGCAGGGGGGTTAGCGACG ACGACGACGACGACGA (SEQ ID NO: 3) |
| G24A | CTAACCCCGGGTGTGGTGGGTGGACAGGGGGGTTAGCGACG ACGACGACGACGACGA (SEQ ID NO: 4) |
| scApt | GCCATTGCCATTGCCATTGCCATTGCCATTGCCATTGCCAT TGCCATTGCCATTGCGACGACGACGACGACGACGA (SEQ ID NO: 5) |

The antitail was acquired with a hexyl-protected 5' thiol. Each aptamer was acquired either un-modified or with a 5' aminohexyl group, and all sequences were stored in a TE buffer (10 mM tris(hydroxymethyl)aminomethane and 1 mM ethylenediaminetetraacetic acid) at −20° C. in the dark until used. Antitail with a protected thiol (5' Thiol Modifier C6 S—S) was deprotected by treatment with a 20× excess of tris(2-carboxyethyl)phosphine (TCEP) in 10× phosphate buffered saline solution at pH 7.4. This was followed by molecular-weight-cutoff filtration (MWCO 3 KDa) and rinsing with ddH$_2$O, to form thiolated antitail (HS-antitail). 0.095 nmol of HS-antitail was added to 0.1 mg of Mal-LPAANP$_{6/54}$ Dox containing 14.3 nmol LPAA. With an estimated LPAA molecular weight of 7,000 Da, a molar ratio of 1:150 HS-antitail:LPAA was used. This ratio was used to maintain comparable aptamer valence to that of previously studied peptide amphiphile micelles displaying aptamers.

To assess whether additional functionalization density would improve LPAANP surface properties, HS-antitail was also added at 1:100 and 1:50 molar ratios to maleimide groups. For each case, HS-antitail was added to Mal-LPAANP$_{6/54}$ Dox in a phosphate buffered saline solution and allowed to react overnight. Lastly, aptamer-tail (C10.36, G24A, scApt, or Cy3 fluorophore-labelled derivatives of each aptamer) was annealed to A-Mal-LPAANP$_{6/54}$ Dox. For fluorescent aptamer synthesis, Cy3-NHS ester was reacted with the amine end of each aptamer to produce Cy3-Apt. A 20× excess of N-hydroxysuccinimide-Cy3 was reacted with each aptamer overnight followed by HPLC purification, concentration, and then buffer exchange by molecular weight cutoff filtration. Each Cy3-aptamer was stored in a TE buffer (10 mM tris(hydroxymethyl)aminomethane and 1 mM ethylenediaminetetraacetic acid) having a pH of 8.5 in the dark at −20° C. until used.

For aptamer decoration of 0.1 mg of A-Mal-LPAANP$_{6/54}$ Dox, 0.29 nmol of aptamer (Apt) was added in a phosphate buffered saline solution supplemented with 6.25 mM MgCl$_2$, to aid in proper aptamer folding. A 3:1 Apt:A ratio was held and samples annealed by heating to 90° C. and cooling to room temperature over 45 minutes. Samples of each of LPAANP$_{6/54}$ Dox, Mal-LPAANP$_{6/54}$ Dox, A-Mal-LPAANP$_{6/54}$ Dox, Apt~A-Mal-LPAANP$_{6/54}$ Dox, and Cy3-Apt~A/Mal-LPAANP$_{6/54}$ Dox were stored at 4° C. in the dark at a concentration of 500 μg/mL in a phosphate buffered saline solution with 6.25 mM MgCl$_2$ prior to further evaluation.

A depiction of the steps of Dox nanoparticle surface modification is shown below. In (a), Dox-entrapped Poly (K$_6$V$_{54}$)C$_{16}$ NPs (i.e. LPAANP$_{6/54}$ Dox) were prepared and suspended in a phosphate buffered saline solution with primary amines on the nanoparticle surface shown as blue crosses. In (b), a Mal-DEG-TFP ester was reacted with surface amines to yield Mal-LPAANP$_{6/54}$ Dox. In (c), a thiolated antitail was reacted with surface maleimide to form A-Mal-LPAANP$_{6/54}$ Dox. In (d), an aptamer was annealed to surface antitail to generate Apt~A-Mal-LPAANP$_{6/54}$ Dox.

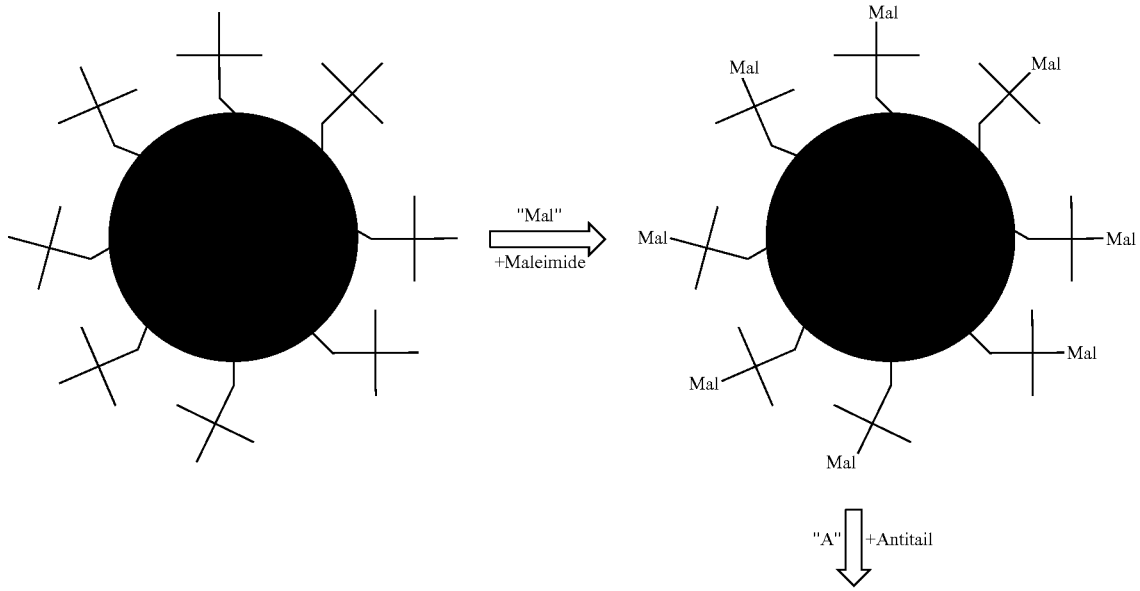

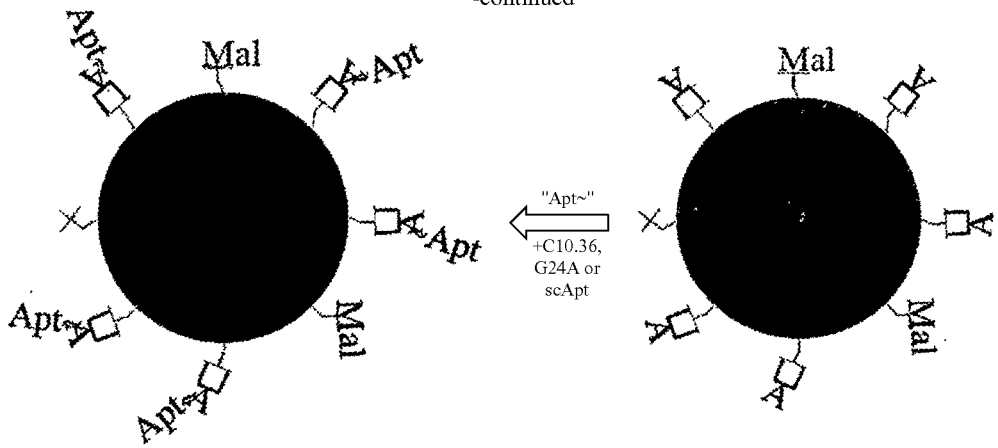

Example 10: Transmission Electron Microscopy (TEM), Fourier-Transform Infrared Spectroscopy (FTIR), and Zeta Potential of Surface Modified Nanoparticles The surface-modified nanoparticles of the above examples were evaluated via transmission electron microscopy (TEM) in a manner similar to that which was used for the non-modified LPAAMs and LPAANPs. However, due to the presence of DNA and phosphate buffered saline, these precipitates had a tendency to be present within salt crystals. FTIR spectra were captured in a phosphate buffered saline solution at 500 µg/mL for each particle type, utilizing a Nicolet 6700 FT-IR instrument (Thermo Scientific). Spectra were collected in the range of 3400 $cm^{-1}$ to 400 $cm^{-1}$. For zeta potential evaluation, surface-modified nanoparticles were diluted to 10 g/mL in 2% of a phosphate buffered saline solution with dd$H_2O$. Zeta potential measurements were taken using a Malvern Zetasizer Nano instrument. DTS1070 gold-plated zeta cuvettes were used with 700 µL of sample solution. Three measurements were taken per sample with standard manufacturer protocols followed. Surface-modified nanoparticles were evaluated from three independently produced batches.

Figure 7:
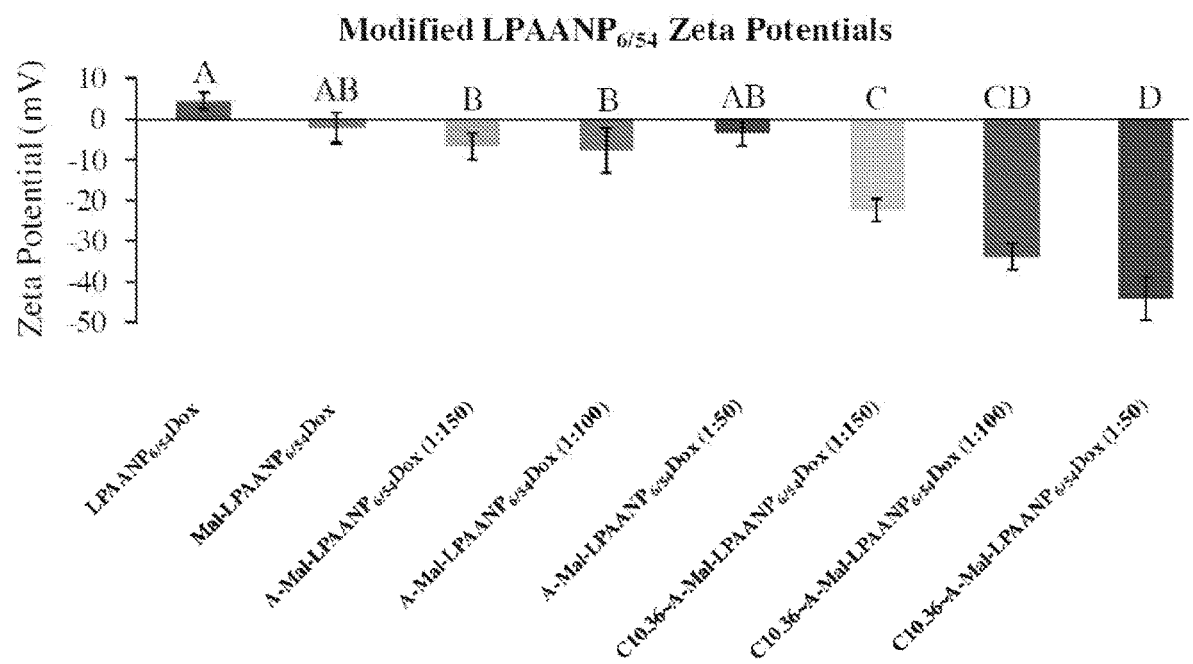
FIG. 7 show the zeta potential for LPAANP$_{6/54}$ Dox with various molecule incorporation and surface modifications.

LPAANP$_{6/54}$ Dox was sequentially surface modified to display cancer cell targeting aptamer (i.e. C10.36). The zeta potential is set forth in FIG. 7. In FIG. 7, groups with different letters have statistically significant differences in means (Tukey HSD, α=0.01). The zeta potential was found to decrease after the conjugation of maleimide and antitail as well as the annealing of aptamer. The concentration-dependent manner of this behaviour indicates desirable variance in the quantity of surface-displayed aptamer.

Example 11: Cellular Delivery of Doxorubicin Via Surface Modified Nanoparticles Surface-modified nanoparticles employing Cy3-aptamers were used in several nanoprecipitate delivery experiments. To ensure that a non-annealed aptamer was not present in the formulation, the Cy3-aptamer was used at a sub-stoichiometric ratio (0.5:1) of Apt:A. Ramos cells (ATCC CRL-1596) were cultured in RPMI media supplemented with 10% fetal bovine serum in a 37° C. humidified incubator at 5% $CO_2$. Prior to treatment, the cells were centrifuged and counted. Suspensions of Ramos cells at a concentration of 125,000 cells in 25 µL of 10% fetal bovine serum in RPMI were prepared in a clear, round bottom 96-well plate. 5 µL of a 10 mg/mL solution of salmon-sperm DNA (ssDNA, commercially available from Sigma-Aldrich) was added as a non-specific competitor for aptamer binding sites.

Nanoparticles of each formulation at 250 µg/mL (20 µL) were added to the cell suspension for a total volume of 50 µL in each well. Each experimental group (Cy3-C10.36~A-Mal-LPAANP$_{6/54}$ Dox, Cy3-G24A~A-Mal-LPAANP$_{6/54}$ Dox, and Cy3-scApt~A-Mal-LPAANP$_{6/54}$ Dox) was incubated with Ramos cells for 10 min followed by rinsing with 150 µL of 10% fetal bovine serum in a phosphate buffered saline solution and subsequent centrifugation at 1,400 RPM for 3 minutes (e.g., in a Thermo Sorvall Legend R+). The cells were resuspended in 150 µL of 10% fetal bovine serum in a phosphate buffered saline solution, a second centrifuge cycle completed, and the cells were resuspended.

The cells were evaluated by flow cytometry utilizing a BD LSRFortessa X-20 instrument with at least 50,000 cells evaluated from each treatment group. Live lymphocytes were identified via forward- and side-scatter measurements. Cy3 fluorescence of the live lymphocytes was quantified by calculating the geometric mean captured from the PE fluorophore channel. This study was independently repeated three times. Aptamer-free samples such as LPAANP$_{6/54}$ Dox, Mal-LPAANP$_{6/54}$ Dox, and A-Mal-LPAANP$_{6/54}$ Dox were not included because weak inherent fluorescence of entrapped Dox was found to be insufficiently bright for evaluation by flow cytometry.

Figure 8:
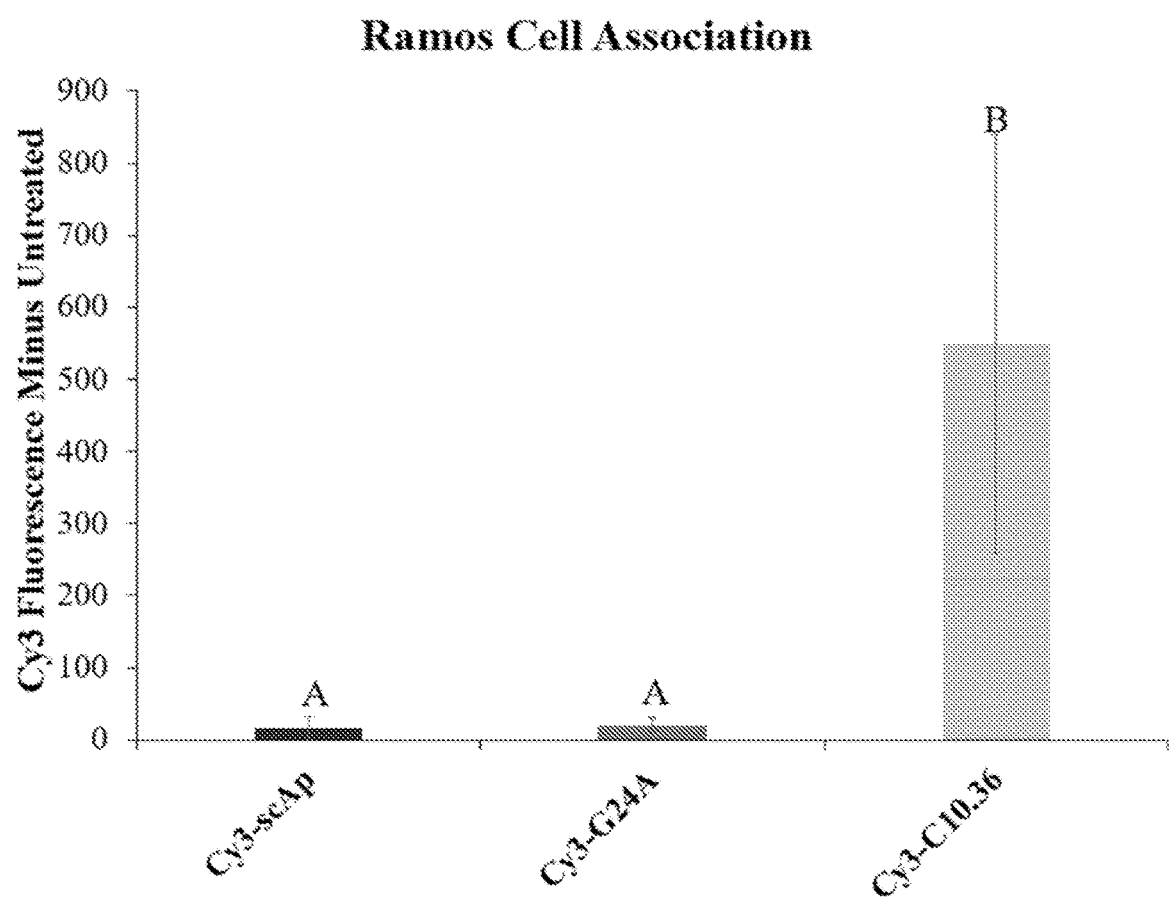
FIG. 8 shows the mean fluorescent intensities from each sample of nanoparticle delivery, as compared to untreated cells.

Relative Cy3 fluorescence was used as a measure for nanoparticle delivery to the cell. The mean fluorescent intensities from each sample compared to untreated cells are shown in FIG. 8, with Cy3-ScApt~A-Mal-LPAANP$_{6/54}$Dox (1:150), Cy3-G24A-A-Mal-LPAANP$_{6/54}$Dox (1:150), and Cy3-C10.36~A-Mal-LPAANP$_{6/54}$Dox (1:150) tested. Groups with different letters have statistically significant differences in means (Tukey HSD, α=0.01). ScApt and G24A were found to have a minor increase in fluorescence over background. However, C10.36-labeled NPs had a ~10-fold increase over background fluorescence. The on-target aptamer (i.e., C10.36) facilitating considerably more Ramos cell association than control aptamers (i.e., scAp and G24A). This represented a statistically significant, aptamer-specific level of association to Ramos cells.

Figure 9:
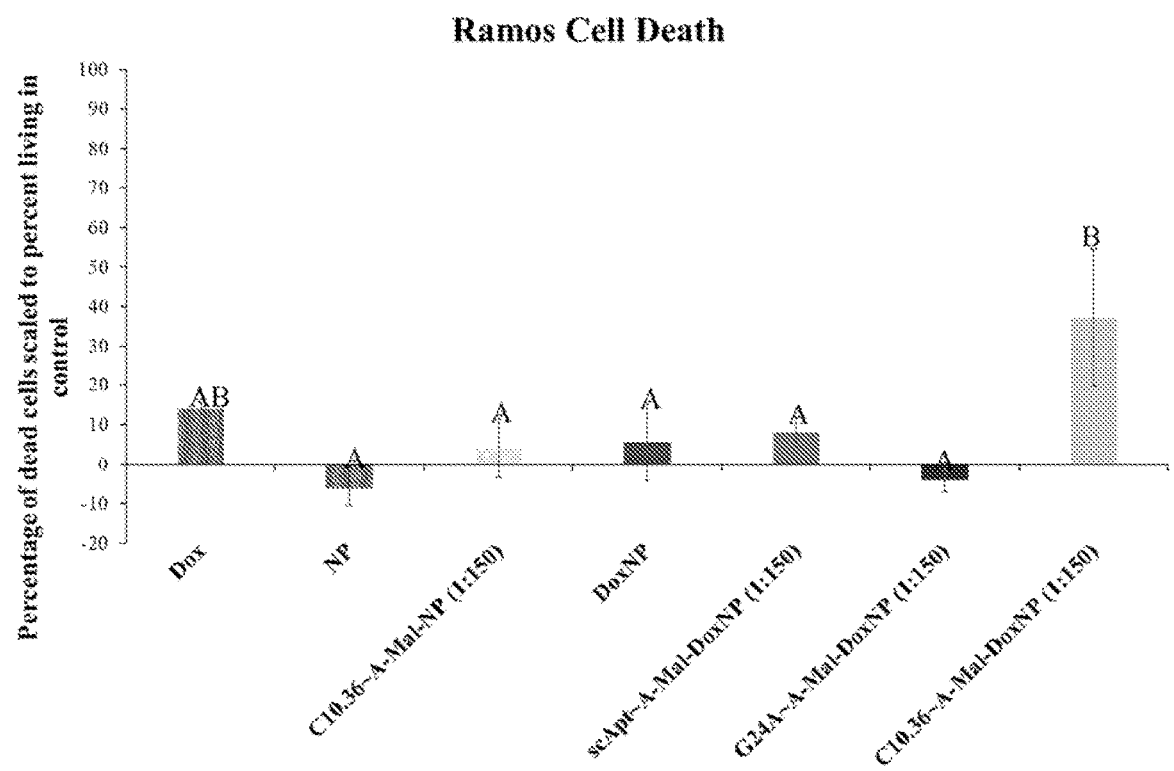
FIG. 9 shows the Ramos cell death due to exposure of a control (i.e., Dox) and LPAANP formulations of Example 11.

To determine whether this aptamer-dependent association would drive a biologically relevant delivery of LPAANP and subsequent release of Dox, Ramos cells were incubated for 10 minutes with Apt~A-Mal-LPAANP$_{6/54}$ Dox and other formulations. The cells were rinsed and cultured for 24 hours at 37° C. Via flow cytometry, the toxicity of each experimental group was measured by 7-AAD death staining. As shown-in FIG. 9, nanoparticles without entrapped doxorubicin had a similar level of death as untreated cells. Additionally, aptamer C10.36 did not influence the background toxicity of doxorubicin-free LPAANP (C10.36~A-LPAANP$_{6/54}$). C10.36~A-Mal-LPAANP$_{6/54}$ Dox were more toxic to Ramos cells compared to all groups other than Dox, including equimolar free Dox. Groups with different letters have statistically significant differences in means (Tukey HSD, $\alpha$=0.01).

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions, methods and processes without departing from the scope of the invention, it is intended that all matter contained in the above description and shown in the accompanying drawings shall be interpreted as illustrative and not in a limiting sense.

The invention claimed is:

1. A lipidated poly(amino acid) consisting of lysine and valine,
wherein at least a portion of the lipidated poly(amino acid) is in the form of a micelle or a nanoparticle,
wherein the micelle or nanoparticle further comprises an entrapped component selected from the group consisting of a therapeutic component, a cancer destroying component, adjuvants, anti-inflammatory therapeutics, immunomodulatory drugs, vaccines, growth factors, a fluorophore-labeled peptide, a fluorophore-labeled peptide amphiphile, a protein, and combinations thereof, and
wherein the lipidated poly(amino acid) comprises a lysine:valine ratio of about 2:1 or less.

2. The lipidated poly(amino acid) of claim 1, wherein the weight ratio of entrapped component to lipidated poly(amino acid) is about 1:2 or less.

3. The lipidated poly(amino acid) of claim 1, wherein the fluorophore-labeled peptide comprises SEQ ID NO: 2.

4. The lipidated poly(amino acid) of claim 1, wherein the fluorophore-labeled peptide amphiphile comprises SEQ ID NO: 1.

5. The lipidated poly(amino acid) of claim 1, wherein the cancer destroying component comprises doxorubicin.

6. The lipidated poly(amino acid) of claim 1, wherein the entrapped component is selected from the group consisting of doxorubicin, SEQ ID NO: 1, SEQ ID NO: 2, and combinations thereof.

7. The lipidated poly(amino acid) of claim 1, wherein the weight ratio of entrapped component to lipidated poly(amino acid) is about 1:9 or less.

8. The lipidated poly(amino acid) of claim 1, wherein the lipidated poly(amino acid) has a critical micelle concentration (CMC) of from about 0.5 to about 7.5 g/mL.

9. The lipidated poly(amino acid) of claim 1, wherein at least a portion of the lipidated poly(amino acid) is in the form of a micelle and has a micelle diameter of about 5.0 nm or greater.

10. The lipidated poly(amino acid) of claim 1, wherein at least a portion of the lipidated poly(amino acid) is in the form of a micelle and has a micelle diameter of about 70 nm or greater.

11. The lipidated poly(amino acid) of claim 1, wherein the lipidated poly(amino acid) displays one or more cell-targeting components.

12. The lipidated poly(amino acid) of claim 2, wherein the cell-targeting components are selected from the group consisting of small molecules, peptides, aptamers, and proteins.

13. The lipidated poly(amino acid) of claim 12, wherein the lipidated poly(amino acid) displays antibodies.

14. A lipidated poly(amino acid) consisting of lysine and valine,
wherein at least a portion of the lipidated poly(amino acid) is in the form of a micelle,
wherein the micelle further comprises an entrapped component selected from the group consisting of a therapeutic component, a cancer destroying component, adjuvants, anti-inflammatory therapeutics, immunomodulatory drugs, vaccines, growth factors, a fluorophore-labeled peptide, a fluorophore-labeled peptide amphiphile, a protein, and combinations thereof, and
wherein the lipidated poly(amino acid) comprises a lysine:valine ratio of about 2:1 or less.

* * * * *

```
                           SEQUENCE LISTING

<160> NUMBER OF SEQ ID NOS: 5

<210> SEQ ID NO 1
<211> LENGTH: 23
<212> TYPE: PRT
<213> ORGANISM: Artificial Sequence
<220> FEATURE:
<223> OTHER INFORMATION: Synthetic
<220> FEATURE:
<221> NAME/KEY: MOD_RES
<222> LOCATION: (1)..(1)
<223> OTHER INFORMATION: Coupled to two palmitic acid moieties
<220> FEATURE:
<221> NAME/KEY: MOD_RES
<222> LOCATION: (2)..(2)
<223> OTHER INFORMATION: Conjugated to 5(6)-carboyxyfluoroscein (FAM)

<400> SEQUENCE: 1

Lys Lys Arg Pro Asp Arg Lys Leu Glu Val Phe Glu Lys Glu Phe Leu
1               5                   10                  15

Arg Met Glu Leu Gly Glu Arg
            20

<210> SEQ ID NO 2
<211> LENGTH: 34
<212> TYPE: PRT
<213> ORGANISM: Artificial Sequence
<220> FEATURE:
<223> OTHER INFORMATION: Synthetic
<220> FEATURE:
<221> NAME/KEY: MOD_RES
<222> LOCATION: (1)..(1)
<223> OTHER INFORMATION: Conjugated to 5(6)-carboyxyfluoroscein (FAM)

<400> SEQUENCE: 2

Gly Arg Lys Lys Arg Arg Gln Arg Arg Arg Pro Pro Arg Pro Asp Arg
1               5                   10                  15

Lys Leu Glu Val Phe Glu Lys Glu Phe Leu Arg Met Glu Leu Gly Glu
            20                  25                  30

Arg Cys

<210> SEQ ID NO 3
<211> LENGTH: 57
<212> TYPE: DNA
<213> ORGANISM: Artificial Sequence
<220> FEATURE:
<223> OTHER INFORMATION: Synthetic

<400> SEQUENCE: 3 ctaacccgg gtgtggtggg tgggcagggg ggttagcgac gacgacgacg acgacga        57
```

```
<210> SEQ ID NO 4
<211> LENGTH: 57
<212> TYPE: DNA
<213> ORGANISM: Artificial Sequence
<220> FEATURE:
<223> OTHER INFORMATION: Synthetic

<400> SEQUENCE: 4
ctaaccccgg gtgtggtggg tggacagggg ggttagcgac gacgacgacg acgacga            57

<210> SEQ ID NO 5
<211> LENGTH: 76
<212> TYPE: DNA
<213> ORGANISM: Artificial Sequence
<220> FEATURE:
<223> OTHER INFORMATION: Synthetic

<400> SEQUENCE: 5
gccattgcca ttgccattgc cattgccatt gccattgcca ttgccattgc cattgcgacg            60
acgacgacga cgacga                                                            76
```